(12) United States Patent
Kageyama et al.

(10) Patent No.: US 9,621,747 B2
(45) Date of Patent: Apr. 11, 2017

(54) INFORMATION PROCESSING APPARATUS AND IMAGING REGION SHARING DETERMINATION METHOD

(75) Inventors: Yuuichi Kageyama, Tokyo (JP); Kuniaki Kurihara, Tokyo (JP)

(73) Assignee: SONY Corporation, Tokyo (JP)

( * ) Notice: Subject to any disclaimer, the term of this patent is extended or adjusted under 35 U.S.C. 154(b) by 762 days.

(21) Appl. No.: 13/367,775

(22) Filed: Feb. 7, 2012

(65) Prior Publication Data
US 2012/0206486 A1 Aug. 16, 2012

(30) Foreign Application Priority Data

Feb. 14, 2011 (JP) ................................ 2011-028897

(51) Int. Cl.
| | |
|---|---|
| *G06K 9/62* | (2006.01) |
| *G06K 9/00* | (2006.01) |
| *G06K 9/36* | (2006.01) |
| *H04N 1/00* | (2006.01) |
| *H04N 5/247* | (2006.01) |
| *H04N 21/218* | (2011.01) |
| *H04N 21/234* | (2011.01) |
| *H04N 21/25* | (2011.01) |
| *H04N 21/258* | (2011.01) |
| *H04N 21/266* | (2011.01) |
| *H04N 21/422* | (2011.01) |
| *H04N 21/4223* | (2011.01) |
| *H04N 21/462* | (2011.01) |

(Continued)

(52) U.S. Cl.
CPC ......... *H04N 1/00251* (2013.01); *H04N 5/247* (2013.01); *H04N 21/21805* (2013.01); *H04N 21/23418* (2013.01); *H04N 21/252* (2013.01); *H04N 21/25841* (2013.01); *H04N 21/26603* (2013.01); *H04N 21/4223* (2013.01); *H04N 21/42202* (2013.01); *H04N 21/4622* (2013.01); *H04N 21/632* (2013.01); *H04N 21/6582* (2013.01)

(58) Field of Classification Search
None
See application file for complete search history.

(56) References Cited

U.S. PATENT DOCUMENTS 6,307,556 B1 * 10/2001 Ellenby et al. ............... 345/427
6,950,535 B2 * 9/2005 Sibayama et al. ............ 382/113
(Continued)

FOREIGN PATENT DOCUMENTS

JP 2008-154192 7/2008

*Primary Examiner* — Matthew Bella
*Assistant Examiner* — Jose M Torres
(74) *Attorney, Agent, or Firm* — Paratus Law Group, PLLC

(57) ABSTRACT

An apparatus and method provide logic for processing information. In one implementation, an apparatus may include a receiving unit configured to receive information associated with a first imaging region and information associated with a second imaging region. The apparatus may also include a determination unit configured to determine, based on at least the first and second imaging region information, whether a portion of the first imaging region is coincident within at least a portion of the second imaging region. A classification unit configured may assign a classification to at least one of the first or second imaging regions, based on the determination.

19 Claims, 26 Drawing Sheets

(51) Int. Cl.
*H04N 21/63* (2011.01)
*H04N 21/658* (2011.01)

(56) References Cited

U.S. PATENT DOCUMENTS

| | | | |
|---|---|---|---|
| 8,144,920 B2* | 3/2012 | Kansal et al. | 382/100 |
| 8,174,572 B2* | 5/2012 | Buehler et al. | 348/143 |
| 8,239,132 B2* | 8/2012 | Ma et al. | 701/438 |
| 2003/0020808 A1* | 1/2003 | Luke et al. | 348/47 |
| 2007/0027591 A1* | 2/2007 | Goldenberg et al. | 701/23 |
| 2009/0303348 A1* | 12/2009 | Inatomi et al. | 348/231.3 |
| 2012/0059826 A1* | 3/2012 | Mate | G06F 17/30843 707/737 |
| 2012/0069192 A1* | 3/2012 | Li | G06T 7/2093 348/159 |

\* cited by examiner (FOCAL DISTANCE, ANGLE OF VIEW, AND SIZE OF IMAGING SURFACE)

FOCAL DISTANCE f: $f_1 > f_2 > f_3 > f_4 > f_5$ (ORIENTATION AND INCLINATION OF IMAGING DEVICE, AND IMAGING REGION)

※ P → Q : OPTICAL AXIS DIRECTION (METHOD FOR CALCULATING IMAGING REGION)

(EXAMPLE OF COMMON IMAGING REGION (SPACE))

(SYSTEM CONFIGURATION)

FIG.11

(EXAMPLE OF INFORMATION)

| DEVICE ID | LATITUDE | LONGITUDE | HEIGHT | AZIMUTHAL ANGLE | INCLINATION ANGLE | ROTATION ANGLE | GROUP ID | IP ADDRESS |
|---|---|---|---|---|---|---|---|---|
| 1 | 35.619397 | 137.73808 | 55 | 350.0 | 5 | 10 | 001 | 8.8.8.7 |
| 2 | 35.619398 | 137.73808 | 54 | 330.0 | -5 | 12 | 001 | 8.8.8.9 |

- AZIMUTHAL ANGLE (CORRESPONDING TO) : 0 TO 360, NORTH = 0, EAST = 90, SOUTH = 180, WEST = 270
- INCLINATION ANGLE (CORRESPONDING TO 90 - θ: -180 TO 180, VERTICAL INCLINATION WITH RESPECT TO STATE IN WHICH DEVICE IS PLACED ON HORIZONTAL PLANE
- ROTATION ANGLE (CORRESPONDING TO λ: -90 TO 90, LATERAL INCLINATION WITH RESPECT TO STATE IN WHICH DEVICE IS PLACED ON HORIZONTAL PLANE

FIG.20

(EXAMPLE OF TAGS)

| DEVICE ID | TAG |
|---|---|
| 1 | LONG DISTANCE |
| 2 | TOKYO SKY TREE/BEST POSITION |

FIG.23

(EXAMPLE OF INFORMATION)

| DEVICE ID | PLAYER'S NAME | NUMBER OF SIMULTANEOUS VIEWERS | RATING |
|---|---|---|---|
| 1 | PLAYERS A, B | 150 | 3.5 |
| 2 | PLAYER A | 5 | 1.2 |

INFORMATION PROCESSING APPARATUS AND IMAGING REGION SHARING DETERMINATION METHOD

CROSS-REFERENCE TO RELATED APPLICATIONS

This application is based upon and claims the benefit of priority from Japanese Patent Application JP 2011-028897, filed on Feb. 14, 2011, the entire contents of which are hereby incorporated by reference.

BACKGROUND

Technical Field

The disclosed exemplary embodiments relate to an imaging device, an information processing device, and an imaging region sharing determination method.

Description of the Related Art

In recent years, attention is focusing on a technology that allows cooperation between a digital still camera, a digital video camera, and a mobile phone and a mobile information terminal etc. that are equipped with an imaging function (hereinafter referred to as imaging devices). For example, a technology is discussed that allows cooperation between a plurality of imaging devices and thereby captures a subject from the front and the back at the same time. Particularly, it is desired to realize a technology which automatically detects imaging devices that can cooperatively work in an image capturing location and which allows cooperation between the detected plurality of imaging devices. For example, Japanese Patent Application Publication No. JP-A-2008-154192 discloses a technology in which shape recognition technology is used to determine whether subjects included in images captured by a plurality of imaging devices match each other, and imaging devices that are capturing images of the same subject are detected.

SUMMARY

However, when the subject is viewed in a different way by individual imaging devices, or in a situation in which a part of the subject is hidden by a shielding object when the subject is viewed from a certain imaging direction, it is difficult to automatically detect the imaging devices that are capturing images of the same subject. For example, it is difficult to automatically detect, as the imaging devices that are capturing images of the same subject, an imaging device that is performing image capture from the front of the subject and an imaging device that is performing image capture from the back of the subject. Further, it is also difficult to automatically detect, as the imaging devices that are capturing the same subject, an imaging device that is performing image capture at a location far away from the subject and an imaging device that is performing image capture in the vicinity of the subject.

To address the above-described problems, the disclosed embodiments provide an imaging device, an information processing device, and an imaging region sharing determination method that are novel and improved and that are capable of easily detecting other imaging devices that are sharing an imaging region.

Consistent with an exemplary embodiment, an information processing apparatus includes a receiving unit configured to receive first information associated with a first imaging region and second information associated with a second imaging region. A determination unit is configured to determine, based on at least the first and second imaging region information, whether a portion of the first imaging region is coincident within at least a portion of the second imaging region. A classification unit is configured to assign a classification to at least one of the first or second imaging regions, based on the determination.

Consistent with an additional exemplary embodiment, an information processing apparatus includes a receiving means for receiving first information associated with a first imaging region and second information associated with a second imaging region. The information processing apparatus includes determination means for determining, based on at least the first and second imaging region information, whether a portion of the first imaging region is coincident within at least a portion of the second imaging region, and classification means for assigning a classification to at least one of the first or second imaging regions, based on the determination.

Consistent with further exemplary embodiment, a computer-implemented method receives first information associated with a first imaging region and second information associated with a second imaging region. The method includes determining, based on at least the first and second imaging region information, whether a portion of the first imaging region is coincident within at least a portion of the second imaging region. The method includes assigning, using a processor, a classification to at least one of the first or second imaging regions, based on the determination.

Consistent with another exemplary embodiment, a tangible, non-transitory computer-readable medium stores instructions that, when executed by at least one processor, cause the processor to perform a method that includes receiving first information associated with a first imaging region and second information associated with a second imaging region. The method includes determining, based on at least the first and second imaging region information, whether a portion of the first imaging region is coincident within at least a portion of the second imaging region. The method includes assigning, using a processor, a classification to at least one of the first or second imaging regions, based on the determination.

According to disclosed exemplary embodiments, it may be possible to easily detect other imaging devices that are sharing an imaging region.

BRIEF DESCRIPTION OF THE DRAWINGS

FIG. 11 is an explanatory diagram showing an example of information handled by the imaging device according to the first exemplary embodiment;

FIG. 20 is an explanatory diagram showing an example of tags that are assigned to imaging devices by the information processing system according to the second exemplary embodiment;

FIG. 23 is an explanatory diagram showing an example of information that is used in a method for assigning a best position tag, in the method for assigning tags according to the second exemplary embodiment;

DETAILED DESCRIPTION

Figure 1:
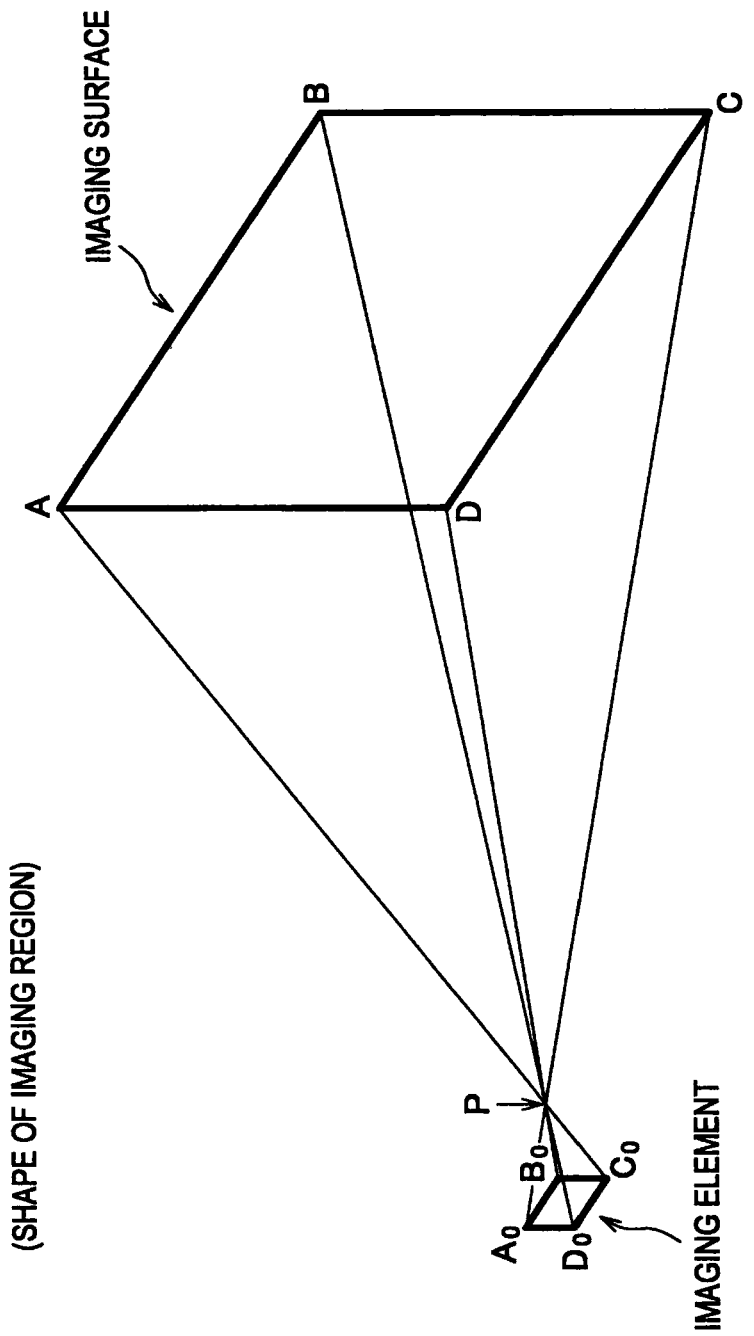
FIG. 1 is an explanatory diagram illustrating a shape of an imaging region, according to an exemplary disclosed embodiment.

Hereinafter, exemplary embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Flow of Explanation

Here, the flow of explanation relating to the exemplary embodiments of the present technology described below will be briefly described. First, a structure of an "imaging region" that appears in the explanation of each of the exemplary embodiments to be described later will be explained with reference to FIG. 1 to FIG. 4. Next, with reference to FIG. 5 to FIG. 7, an overview of a technology according to each of the exemplary embodiments to be described later will be explained, and also a structure of a "common imaging region" that appears in the explanation of each of the exemplary embodiments will be explained.

Next, an example of a system configuration that is assumed in a first exemplary embodiment of the present technology will be explained with reference to FIG. 8. Then, a functional configuration example and an operation example of an imaging device according to the first exemplary embodiment of the present technology will be explained with reference to FIG. 9 to FIG. 11. Further, a functional configuration example and an operation example of an imaging device according to a modified example of the first exemplary embodiment will be explained with reference to FIG. 12 and FIG. 13.

Next, an example of a system configuration that is assumed in a second exemplary embodiment of the present technology will be explained with reference to FIG. 14. Then, a functional configuration example of an imaging device according to the second exemplary embodiment of the present technology will be explained with reference to FIG. 15. Then, a functional configuration example of an information processing system according to the second exemplary embodiment of the present technology will be explained with reference to FIG. 16. Then, an operation example of the information processing system according to the second exemplary embodiment of the present technology will be explained with reference to FIG. 17 to FIG. 25.

Next, a hardware configuration example that can achieve some of the functions of the imaging devices according to the first and second exemplary embodiments of the present technology, and the functions of the information processing system according to the second exemplary embodiment will be explained with reference to FIG. 26. Lastly, a technical idea according to the first and second exemplary embodiments of the present technology will be summarized, and operational effects obtained from the technical idea will be briefly explained.

Explanation Items

1: Introduction
   1-1: Structure of imaging region
   1-2: Overview of exemplary embodiments
2: First exemplary embodiment
   2-1: System configuration
   2-2: Configuration of imaging device
      2-2-1: Functional configuration
      2-2-2: Operations
   2-3: (Modified Example) Configuration of imaging device
      2-3-1: Functional configuration
      2-3-2: Operations
3: Second exemplary embodiment
   3-1: System configuration
   3-2: Configuration of imaging device
   3-3: Configuration of information processing system 3-4: Functional details
   3-4-1: Assignment of various tags
   3-4-2: Mapping of neighboring devices
   3-4-3: Assignment of best position tag
   3-4-4: Simultaneous use of image recognition technology 4: Hardware configuration example
5: Conclusion
1: Introduction In recent years, imaging devices equipped with a function to acquire current position information are widely available on the market. The function to acquire current position information is achieved using a function of a global positioning system (GPS) or Wi-Fi (registered trademark), for example. Further, recently, imaging devices equipped with a function of an electronic compass, an acceleration sensor or the like are also available on the market. When the function of the electronic compass is used, it is possible to acquire an imaging direction. When the acceleration sensor is used, it is possible to acquire an inclination of the imaging device. The exemplary embodiments to be described later relate to a mechanism in which the current position, the imaging direction, the inclination and the like are used to detect a set of imaging devices that are capturing images of the same subject.

1-1: Structure of Imaging Region

First, the structure of the imaging region will be explained with reference to FIG. 1 to FIG. 4. The term "imaging region" used herein indicates an imaging space that is reflected in an imaging element provided in an imaging device. More specifically, an image of a subject that exists inside the imaging region is reflected in the imaging element. Normally, the shape of the imaging element is a rectangle. Therefore, as shown in FIG. 1, the imaging region has a square pyramid shape in which a bottom surface is an imaging surface. The square pyramid shape is defined by four straight lines that connect four corners $A_0$, $B_0$, $C_0$ and $D_0$ of the imaging element and four corners A, B, C and D of the imaging surface. The four straight lines intersect with each other at a point P on a vertical line drawn to the center of the imaging element.

Figure 2:
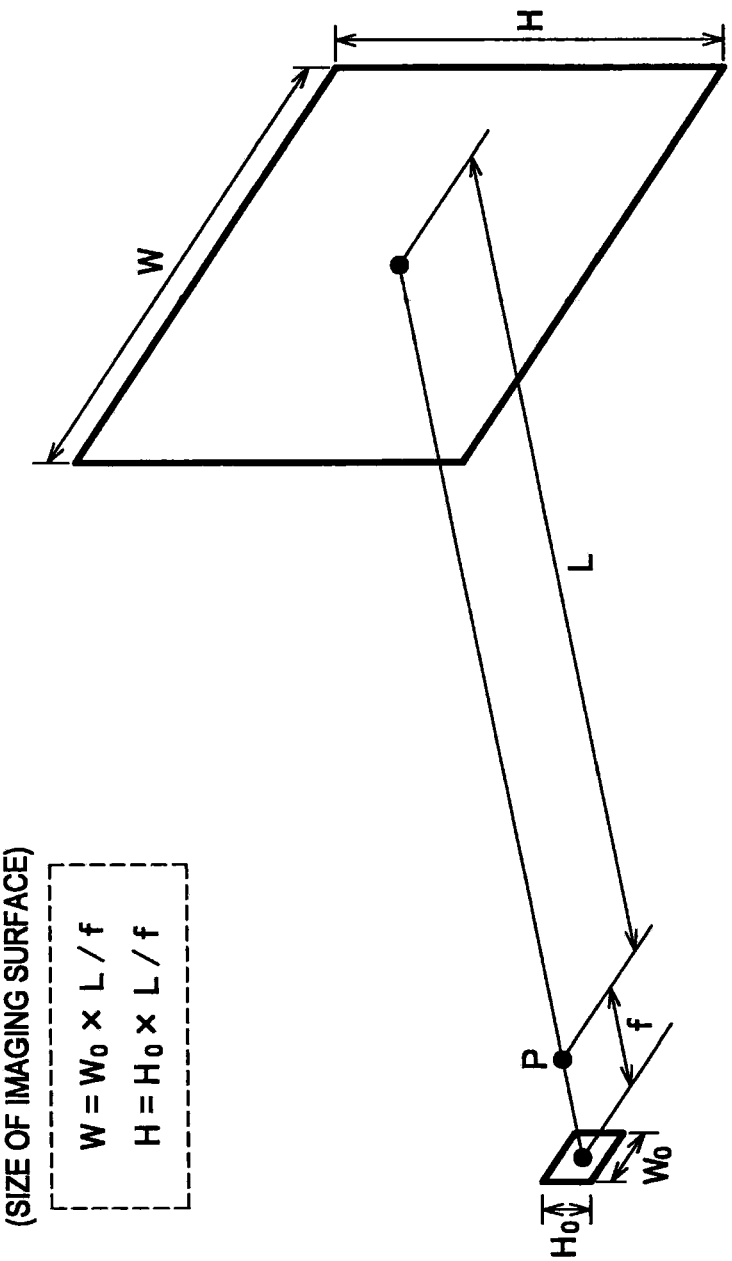
FIG. 2 is an explanatory diagram illustrating a method for calculating a size of an imaging surface, according to an exemplary disclosed embodiment.

The position of the aforementioned point P is defined by a focal distance f that is determined by characteristics of an optical system with which the imaging device is equipped. As shown in FIG. 2, the point P is positioned on the vertical line drawn to the center of the imaging element, and a distance from the imaging element to the point P is equal to the focal distance f. If a width of the imaging element is denoted by $W_0$, a height of the imaging element is denoted by $H_0$, a width of the imaging surface that is separated from the point P by a distance L is denoted by W, and a height of the imaging surface is denoted by H, a relationship shown by the following Equation (1) and Equation (2) is established between W, $W_0$, H and $H_0$. Therefore, the imaging region P-A-B-C-D is determined by a size ($W_0$, $H_0$) of the imaging element, the focal distance f, and the distance L to the imaging surface.

$$W = W_0 \times L/f \quad (1)$$

$$H = H_0 \times L/f \quad (2)$$

Figure 3:
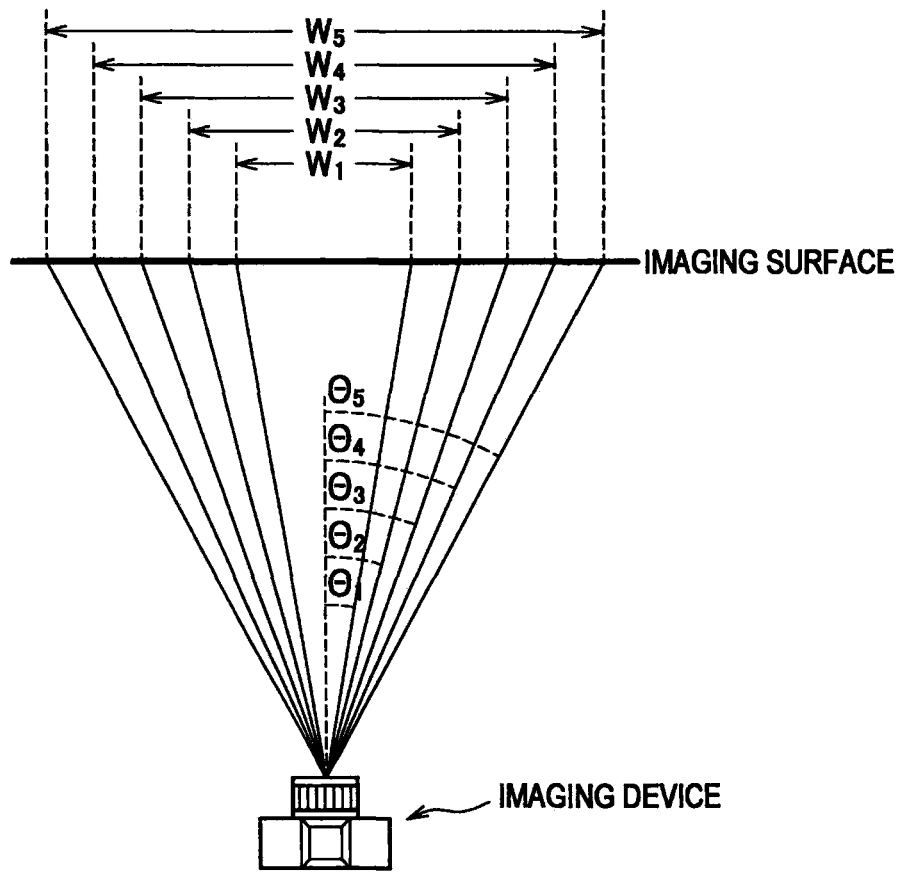
FIG. 3 is an explanatory diagram illustrating a focal distance, an angle of view and the size of the imaging surface, according to an exemplary disclosed embodiment.

Note that the four straight lines that define the square pyramid are determined without having to use the distance L. When the focal distance f is determined, an angle of view $\Theta$ is determined. Therefore, the width W and the height H of the imaging surface are determined in accordance with the focal distance f. FIG. 3 schematically shows variations $\Theta_1$ to $\Theta_5$ of the angle of view $\Theta$ and variations $W_1$ to $W_5$ of the width W of the imaging surface (note that the distance L is fixed) that occur when the focal distance f is varied from $f_1$ to $f_5$. As shown in FIG. 3, as the focal distance f becomes shorter, the angle of view $\Theta$ becomes larger. Further, as the angle of view $\Theta$ becomes larger, the width W of the imaging surface that is located at the same distance L becomes larger. When a zoom lens is used for the optical system, the focal distance f can be adjusted without replacing the optical system. Note that, if the distance L is defined as a distance up to the subject, the distance L can be automatically measured by measuring a distance at which the subject is in focus.

Figure 4:
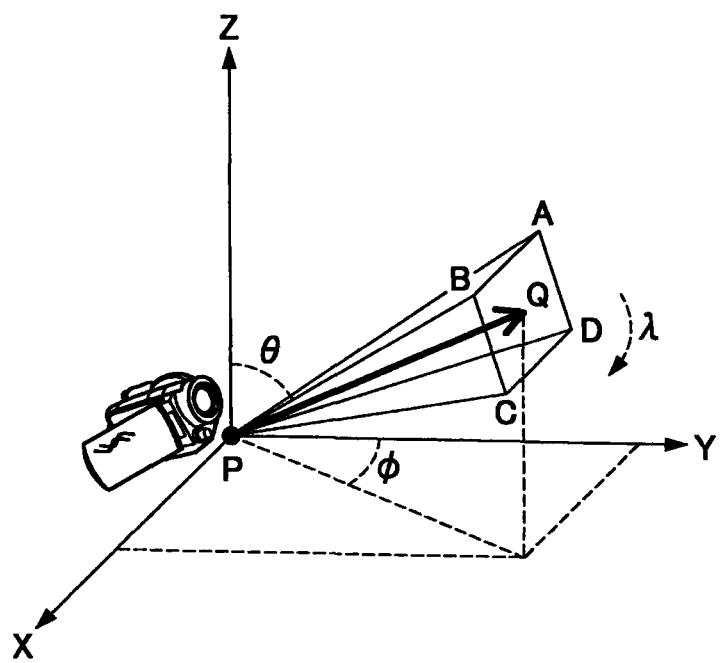
FIG. 4 is an explanatory diagram illustrating a relationship between an orientation and inclination of an imaging device and the shape of the imaging region, according to an exemplary disclosed embodiment.

It is explained above that the imaging region has a square pyramid shape. It is also described that this square pyramid is defined by the size ($W_0$, $H_0$) of the imaging element, the focal distance f and the like. Next, an orientation of the imaging region will be explained with reference to FIG. 4. Note that, a distance $L_0$ from the imaging element to a vertex P of the square pyramid is sufficiently small with respect to the distance L ($L_0 \ll L$), and therefore, for the purpose of simplifying the following explanation, it is assumed that the imaging device is positioned substantially on the point P. As shown in FIG. 4, the imaging device is oriented with respect to a certain direction and is inclined with respect to a horizontal plane. Therefore, when considering the imaging region, it is necessary to consider the orientation and inclination of the imaging region that are in accordance with the orientation and inclination of the imaging device.

FIG. 4 depicts an X axis, a Y axis and a Z axis that are orthogonal to each other, and schematically shows a relationship between the inclination of the imaging device with respect to each of the axes and the shape of the imaging region. For example, if an X-Y plane is taken as the horizontal plane, the X direction can be set to East, the –X direction can be set to West, the Y direction can be set to North, and the –Y direction can be set to South. In this case, when an electronic compass is used, it is possible to detect an inclination $\phi$ of the imaging device in the X-Y plane. Further, when an acceleration sensor is used, it is possible to detect an inclination $\theta$ of the imaging direction with respect to the Z axis. Further, when the acceleration sensor is used, it is possible to detect an angle of rotation $\lambda$ (for example, an inclination in a Z-X plane may be used as an approximate value) of the imaging device whose optical axis serves as an axis of rotation.

For example, when the point P is made coincident with an origin point (0, 0, 0), coordinates of a point Q are expressed as (Qx, Qy, Qz)=(L·cos θ, L·sin θ·cos φ, L·sin θ·sin φ). A length of a vertical line drawn from the point Q to a line segment AB is ($H_0/2f$), and a length of a vertical line drawn from the point Q to a line segment BC is ($W_0/2f$). Further, a length of a vertical line drawn from the point Q to a line segment CD is ($H_0/2f$), and a length of a vertical line drawn from the point Q to a line segment DA is ($W_0/2f$). From this relationship, equations for a line segment PA that passes the two points P and A, a line segment PB that passes the two points P and B, a line segment PC that passes the two points P and C, and a line segment PD that passes the two points P and D can be calculated using the parameters $H_0$, $W_0$ and f that have already been given, and the parameters θ, φ and λ that can be detected.

Let us consider a case in which θ=π/2, λ=0, φ'=π/2−φ, and φ'≪1. In this case, a vector PA directing from the point P to the point A is expressed by the following Equation (3). Further, a vector PB directing from the point P to the point B is expressed by the following Equation (4), a vector PC directing from the point P to the point C is expressed by the following Equation (5), and a vector PD directing from the point P to the point D is expressed by the following Equation (6). More specifically, when the imaging device is placed on the horizontal plane and the direction of the imaging device is set such that the imaging device is oriented substantially in the X direction, the imaging region is expressed as the square pyramid that is defined by the four straight lines that pass the point P and that are oriented in directions of the vectors that are expressed by the following Equations (3) to (6).

Vector $PA$: $(1, \phi' + W_0/2f, H_0/2f)$ (3)

Vector $PB$: $(1, \phi' - W_0/2f, H_0/2f)$ (4)

Vector $PC$: $(1, \phi' + W_0/2f, -H_0/2f)$ (5)

Vector $PD$: $(1, \phi' - W_0/2f, -H_0/2f)$ (6)

Hereinabove, the structure of the imaging region is explained.

1-2: Overview of Exemplary Embodiments

Figure 5:
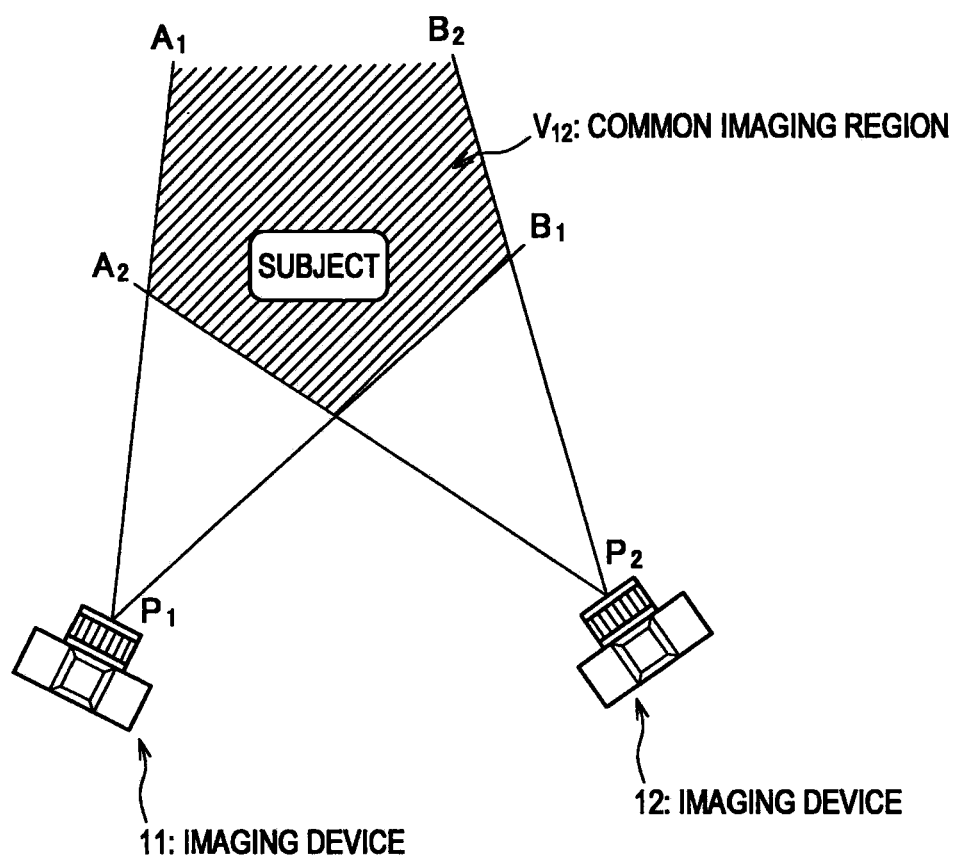
FIG. 5 is an explanatory diagram illustrating a common imaging region, according to an exemplary disclosed embodiment.

Next, an overview of the exemplary embodiments to be described later will be explained with reference to FIG. 5 to FIG. 7. The technology according to the exemplary embodiments to be described later detects overlapping of imaging regions, and thereby detects imaging devices that are capturing images of the same subject. As shown in FIG. 5, when a plurality of imaging devices 11 and 12 are capturing images of the same subject, the subject is included in an imaging region $P_1$-$A_1$-$B_1$ of the imaging device 11 as well as in an imaging region $P_2$-$A_2$-$B_2$ of the imaging device 12. Therefore, the imaging region $P_1$-$A_1$-$B_1$ of the imaging device 11 and the imaging region $P_2$-$A_2$-$B_2$ of the imaging device 12 intersect with each other. In the explanation below, a region where a plurality of imaging regions intersect with each other is referred to as a "common imaging region". In the example shown in FIG. 5, a hatched portion $V_{12}$ is the common imaging region.

Although in the above-described explanation, the imaging region is considered three-dimensionally, it is also possible to consider the imaging region two-dimensionally for the purpose of simplifying processing. In the example shown in FIG. 5, intersection of the imaging regions is considered two-dimensionally. In this case, each of the imaging regions has a triangular shape in which the point P is a vertex. For example, the imaging region $P_1$-$A_1$-$B_1$ is expressed by a straight line $P_1A_1$ that connects two points $P_1$ and $A_1$, and a straight line $P_1B_1$ that connects two points $P_1$ and $B_1$. Similarly, the imaging region $P_2$-$A_2$-$B_2$ is expressed by a straight line $P_2A_2$ that connects two points $P_2$ and $A_2$, and a straight line $P_2B_2$ that connects two points $P_2$ and $B_2$. Therefore, intersection of these two imaging regions can be detected by determining whether or not the straight lines $P_1A_1$ and $P_1B_1$ intersect with the straight lines $P_2A_2$ and $P_2B_2$.

Figure 6:
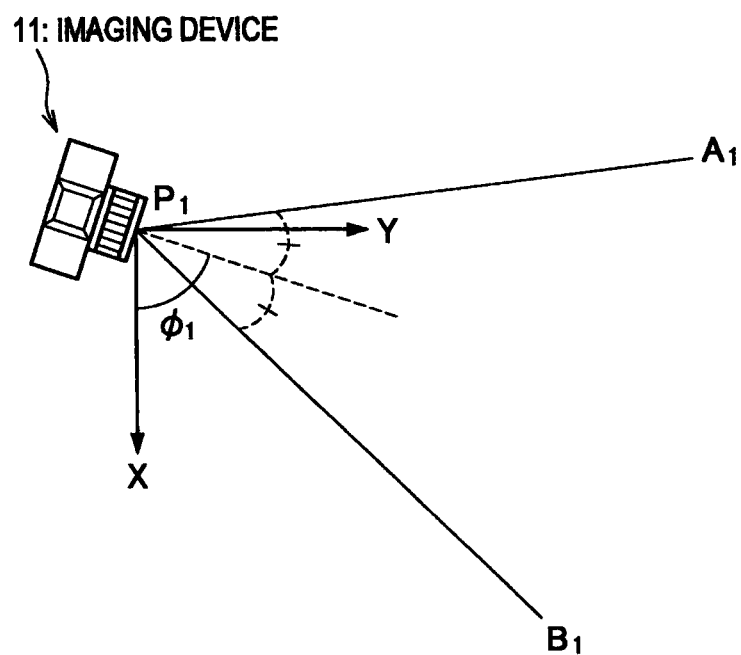
FIG. 6 is an explanatory diagram illustrating a method for calculating the imaging region, according to an exemplary disclosed embodiment.
Figure 7:
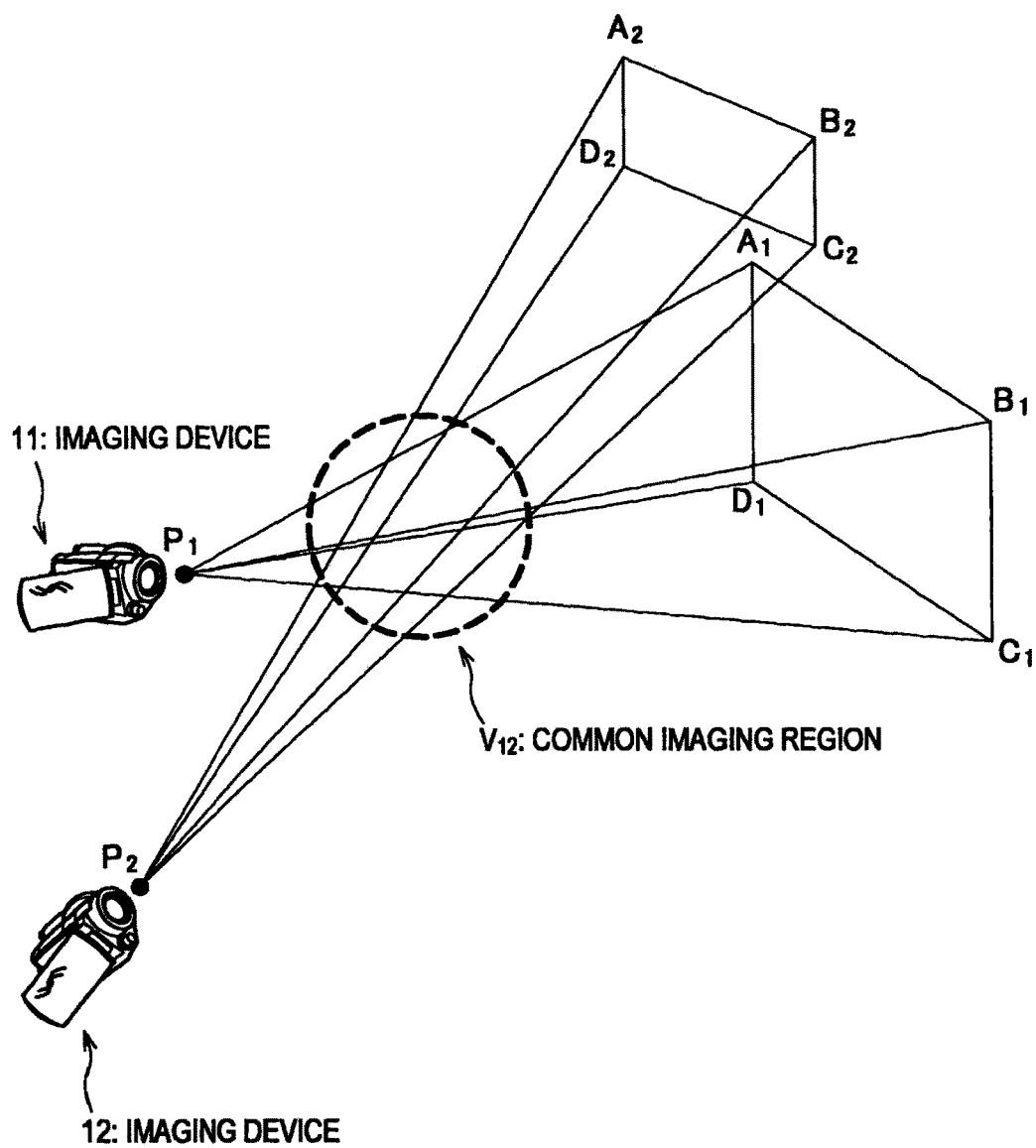
FIG. 7 is an explanatory diagram illustrating the common imaging region, according to an exemplary disclosed embodiment.

For example, when the imaging device 11 is placed on the X-Y plane as shown in FIG. 6, an equation of the straight line $P_1A_1$ is expressed by the following Equation (7). Similarly, an equation of the straight line $P_1B_1$ is expressed by the following Equation (8). Note that it is assumed that the focal distance is $f_1$, the width of the imaging element is $W_1$, and $\phi_1 \ll 1$. As can be understood also from the form of the following Equation (7) and Equation (8), it is possible to reduce a computation load when the imaging region is treated two-dimensionally, as compared to when the imaging region is treated three-dimensionally. However, as shown in FIG. 7, when the imaging region is treated three-dimensionally, higher accuracy can be obtained because differences in the inclination and orientation of the imaging devices 11 and 12 can be considered. For that reason, whether to treat the imaging region two-dimensionally or three-dimensionally should be appropriately set depending on required accuracy and computing power of the imaging device.

Straight line $P_1A_1$: $Y = (\phi + W_1/2f)X$ (7)

Straight line $P_1B_1$: $Y = (\phi - W_1/2f)X$ (8)

The overview of the exemplary embodiments to be described later is explained above. As described above, the exemplary embodiments to be described later relate to the technology that detects imaging devices that are capturing the same subject, by detecting the common imaging region. Hereinafter, this technology will be explained in more detail.

2: First Exemplary Embodiment

Hereinafter, the first exemplary embodiment of the present technology will be explained.

2-1: System Configuration

First, the system configuration that is assumed in the present exemplary embodiment will be explained with reference to FIG. 8. FIG. 8 is an explanatory diagram illustrating the system configuration that is assumed in the present exemplary embodiment. This system achieves a function which detects a set of imaging devices having imaging regions that intersect with each other, from among a plurality of imaging devices located in a neighboring area, and which allows cooperation between the set of imaging devices.

Figure 8:
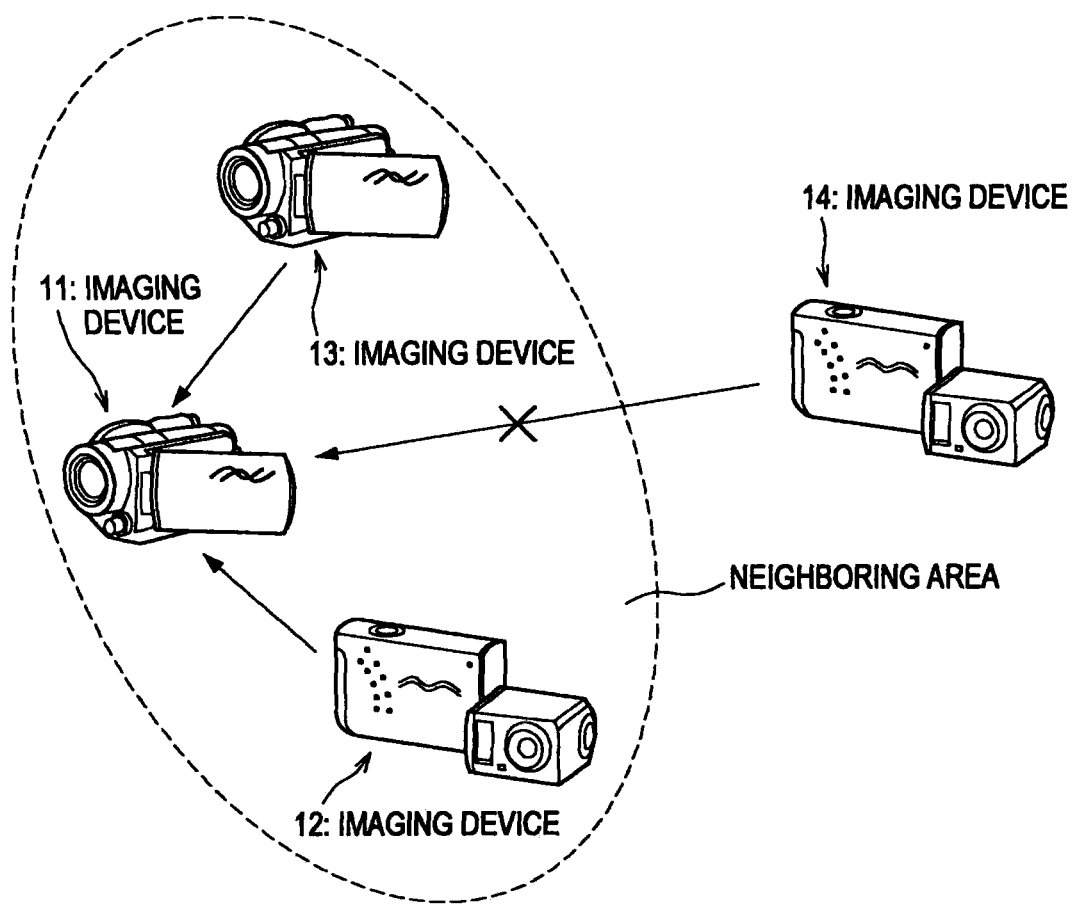
FIG. 8 is an explanatory diagram illustrating an example of a system configuration that is assumed in a first exemplary embodiment.

For example, as shown in FIG. 8, it is assumed that the imaging devices 11 and 12 and imaging devices 13 and 14 exist in the system, and among them, the imaging devices 11, 12 and 13 exist in the neighboring area. Further, the explanation will be given focusing on a function of the imaging device 11. First, the imaging device 11 detects existence of the imaging devices 12 and 13 that are located in the neighboring area. For example, the imaging device 11 collects position information that is acquired, respectively, by the imaging devices 12, 13 and 14 using a GPS etc., and the imaging device 11 selects the imaging devices 12 and 13 located in the neighboring area, based on a positional relationship between them. Note that, when it is possible to connect to an external server, such as a cloud system, the imaging device 11 transmits position information that is acquired using the GPS etc. to the external server, and acquires information of the imaging devices 12 and 13 located in the neighboring area.

When the imaging device 11 detects the existence of the imaging devices 12 and 13 located in the neighboring area, the imaging device 11 acquires information of imaging regions from the imaging devices 12 and 13. The information of the imaging regions that is acquired here includes information that defines the shape of each of the imaging regions as shown in Equation (3) to Equation (8) described above. At this time, the imaging device 11 may acquire position information of the imaging devices 12 and 13 and images etc. that are captured by the imaging devices 12 and 13. Further, the imaging device 11 calculates its own imaging region. Then, the imaging device 11 determines whether or not the imaging region of the imaging device 11 intersects with the imaging regions of the imaging devices 12 and 13. In summary, the imaging device 11 detects existence of the common imaging region. For example, let us assume that the imaging region of the imaging device 11 intersects with the imaging region of the imaging device 12. In this case, the imaging device 11 performs cooperative processing with the imaging device 12.

The system configuration that is assumed in the present exemplary embodiment is described above. Hereinafter, the configuration of the imaging device 11 that determines the intersection of imaging regions will be explained in more detail. Note that, although the explanation below will be given focusing on the imaging device 11, the imaging devices 12 and 13 may also have substantially the same configuration as that of the imaging device 11, or a configuration that is partially simplified.

2-2: Configuration of Imaging Device

Hereinafter, the configuration of the imaging device 11 according to the first exemplary embodiment will be explained.

2-2-1: Functional Configuration

Figure 9:
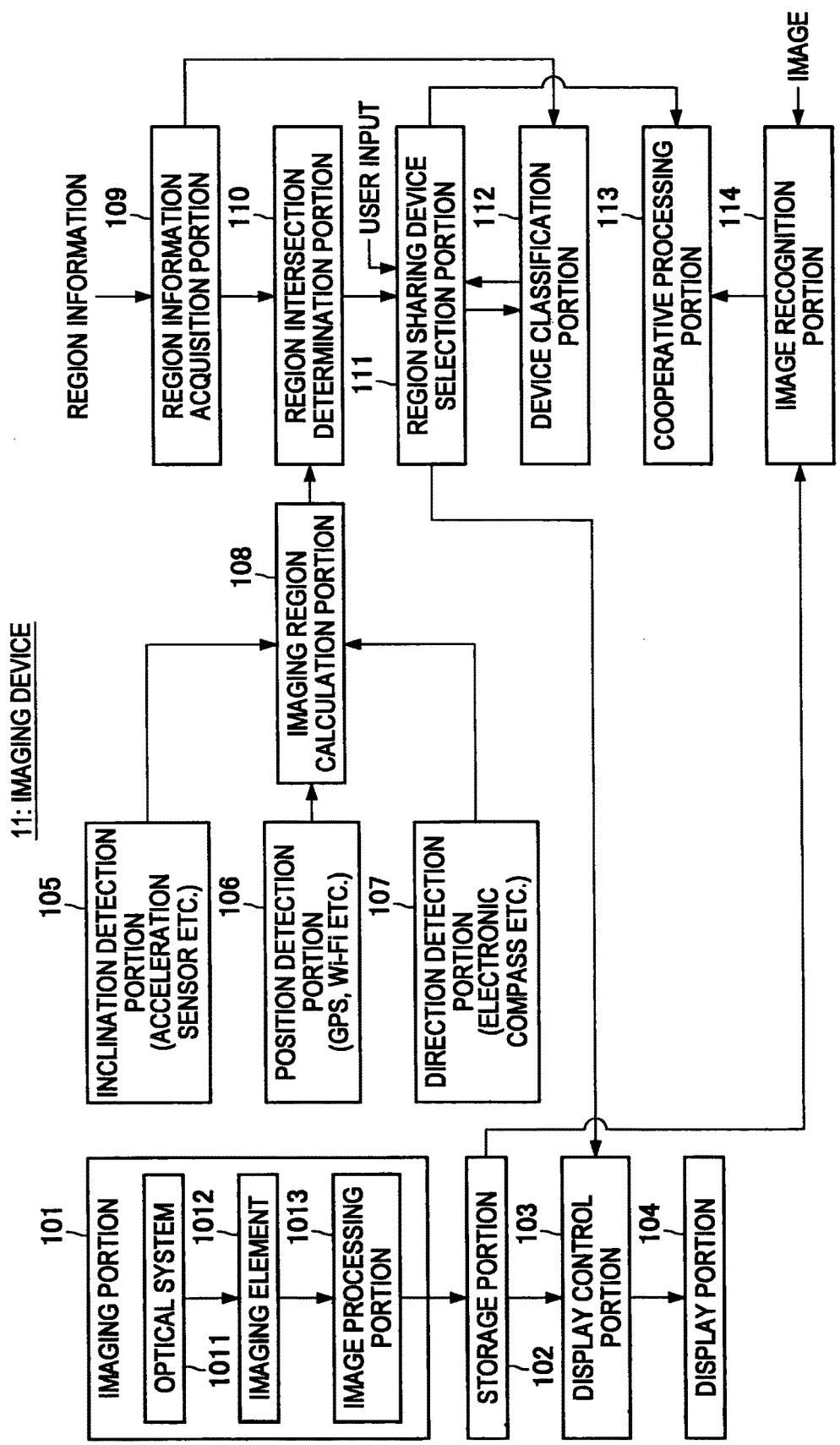
FIG. 9 is an explanatory diagram illustrating a functional configuration example of an imaging device according to the first exemplary embodiment.

First, a functional configuration of the imaging device 11 according to the present exemplary embodiment will be explained with reference to FIG. 9. FIG. 9 is an explanatory diagram illustrating the functional configuration of the imaging device 11 according to the present exemplary embodiment.

As shown in FIG. 9, the imaging device 11 includes an imaging portion 101, a storage portion 102, a display control portion 103 and a display unit, an example of which is a display portion 104. Further, the imaging device 11 includes detection units, examples of which include an inclination detection portion 105, a position detection portion 106, a direction detection portion 107. Imaging device 11 also includes a calculation unit, an example of which is imaging region calculation portion 108, a receiving unit, an example of which is a region information acquisition portion 109, a determination unit, an example of which is a region intersection determination portion 110, a region sharing device selection portion 111, a classification unit, an example of which is a device classification portion 112, a cooperative processing portion 113 and an image recognition unit, an example of which is an image recognition portion 114. The imaging portion 101 mainly includes an optical system 1011, an imaging element 1012 and an image processing portion 1013. Note that, although not explicitly shown in FIG. 9, the imaging device 11 further includes an input unit, a communication unit and the like.

First, a functional configuration relating to imaging processing will be explained.

When the imaging processing is started, an image of the subject is captured by the imaging portion 101. First, light reflected by the subject enters the imaging element 1012 through the optical system 1011. When the light enters the imaging element 1012, the imaging element 1012 photoelectrically converts the incident light and generates an electrical signal. The electrical signal generated by the imaging element 1012 is input to the image processing portion 1013. The image processing portion 1013 converts the electrical signal input from the imaging element 1012 to a digital signal, and generates image data from the digital signal. For example, the image processing portion 1013 generates the image data by encoding the digital signal using a predetermined encoding method. The image data generated by the image processing portion 1013 is recorded in the storage portion 102. The image data recorded in the storage portion 102 is read out by the display control portion 103 and displayed on the display portion 104.

The functional configuration relating to the imaging processing is explained above. Note that, for example, a semiconductor storage device, a magnetic recording device, an optical recording device, a magneto-optical recording device or the like can be used as the storage portion 102. Further, the storage portion 102 may be a removable disk that can be removed from the imaging device 11.

Next, a functional configuration relating to processing that detects the imaging device (the imaging device 12, in the above-described example) with which the imaging device 11 is to cooperate will be explained.

First, the inclination detection portion 105 detects an inclination of the imaging device 11. For example, a function of the inclination detection portion 105 is achieved by an acceleration sensor or the like. Examples of the inclination of the imaging device 11 include an inclination of the optical axis with respect to the horizontal plane (the ground surface), and an inclination of the rotation direction when the optical axis serves as the axis of rotation. Note that, actually, a three-dimensional inclination is detected in a state in which the imaging device 11 is placed horizontally. In a state in which the imaging device 11 is placed on the horizontal plane, if a light receiving surface of the imaging element 1012 is perpendicular to the horizontal plane and a bottom surface of the light receiving surface is in parallel with the horizontal plane, the inclination of the optical axis, and the inclination of the rotation direction when the optical axis serves as the axis of rotation can be detected as described above, based on a detection result of the inclination detection portion 105.

Information of the inclination detected in this manner by the inclination detection portion 105 is input to the imaging region calculation portion 108. Note that an angle of inclination, an angle of rotation and the like can also be used to express inclination. Note however that the angle of inclination indicates a vertical inclination with respect to a state in which the imaging device 11 is placed on the horizontal plane. On the other hand, the angle of rotation indicates a lateral inclination with respect to the state in which the imaging device 11 is placed on the horizontal plane.

The position detection portion 106 detects position information of the imaging device 11. For example, a function of the position detection portion 106 can be achieved using GPS, Wi-Fi (registered trademark), or the like. For example, latitude and longitude can be used to express position information. The position information detected by the position detection portion 106 is input to the imaging region calculation portion 108. Further, the direction detection portion 107 detects an orientation of the imaging device 11. For example, a function of the direction detection portion 107 can be achieved using an electronic compass or the like. For example, an azimuthal angle can be used to express orientation. Information of the orientation detected by the direction detection portion 107 is input to the imaging region calculation portion 108.

As described above, the inclination information, the position information and the orientation information are input to the imaging region calculation portion 108. When these pieces of information are input, the imaging region calculation portion 108 calculates the imaging region using the input information. As already explained above, the imaging region is expressed by four or two straight lines that define a square pyramid or a triangle. The equations (refer to the above-described Equation (3) to Equation (8), for example) that indicate these straight lines are calculated from the focal distance that is determined by the optical system 1011, the size of the imaging element 1012, the position information, the inclination information and the orientation information. The information of the imaging region (hereinafter referred to as region information) calculated in this manner is input to the region intersection determination portion 110. Note that the imaging region calculation portion 108 may be configured such that the region information is uploaded to an external server, such as a cloud system.

Next, the region information acquisition portion 109 detects imaging devices existing in the neighboring area. Here, an explanation will be given assuming that the imaging devices 12 and 13 are detected. When the imaging devices 12 and 13 are detected, the region information acquisition portion 109 acquires region information from the imaging devices 12 and 13. For example, imaging devices 12 and 13 may be detected when spatial positions of the imaging devices 12 and 13 fall within a threshold distance of a spatial position of imaging device 11. Note that detection of the imaging devices existing in the neighboring area and management of the region information may be performed by an external server, such as a cloud system. In this case, the region information acquisition portion 109 transmits the position information detected by the position detection portion 106 to the external server, and delegates the detection of the imaging devices existing in the neighboring area to the external server. Then, the region information acquisition portion 109 acquires, from the external server, the region information of the imaging devices 12 and 13 existing in the neighboring area.

The region information of the imaging devices 12 and 13 acquired in this manner is input to the region intersection determination portion 110 and the device classification portion 112. When the region information is input, the region intersection determination portion 110 determines whether or not the imaging regions of the imaging devices 11, 12 and 13 intersect with each other, based on the input region information. First, the region intersection determination portion 110 determines whether or not the imaging region of the imaging device 11 intersects with the imaging region of the imaging device 12. Further, the region intersection determination portion 110 determines whether or not the imaging region of the imaging device 11 intersects with the imaging region of the imaging device 13. A determination result obtained in this manner is input to the region sharing device selection portion 111. Here, an explanation will be given assuming that the imaging region of the imaging device 11 intersects with the imaging region of the imaging device 12.

When the determination result by the region intersection determination portion 110 is input, the region sharing device selection portion 111 selects, based on the input determination result, the imaging device (the imaging device 12) having the imaging region that intersects with the imaging region of the imaging device 11. Information of the selection result by the region sharing device selection portion 111 is input to the display control portion 103, the device classification portion 112 and the cooperative processing portion 113. The display control portion 103, into which the information of the selection result has been input, displays the input information of the selection result on the display portion 104. The device classification portion 112, into which the information of the selection result has been input, classifies the imaging device selected by the region sharing device selection portion 111, based on the input information of the selection result.

For example, in accordance with a distance from the subject, a distance from the imaging device 11 and an imaging direction, the device classification portion 112 classifies the imaging device selected by the region sharing device selection portion 111. Note that the distance from the subject can be estimated by the distance between the position of the imaging device that is the target of classification (hereinafter referred to as a classification-target imaging device) and the imaging surface. Further, the distance from the imaging device 11 can be estimated based on the position information of the classification-target imaging device and the position information of the imaging device 11. Then, the imaging direction can be estimated from the orientation of the classification-target imaging device. A classification result by the device classification portion 112 is input to the region sharing device selection portion 111. For example, information of the imaging device that is performing image capture from the front side of the subject is input to the region sharing device selection portion 111.

A user may want to select a particular imaging device only, as an imaging device with which cooperation is possible (hereinafter referred to as a cooperation-target imaging device), from among the imaging devices that are sharing the imaging region. For example, the user may want to select only the imaging device that is performing image capture from the rear side of the subject. In such a case, the imaging device 11 utilizes the classification result by the device classification portion 112. For example, when the user performs an operation to select only the imaging device that is performing image capture from the rear side of the subject, the region sharing device selection portion 111 selects the imaging device that is performing image capture from the rear side of the subject, based on the classification result by the device classification portion 112. The result selected in this manner by the region sharing device selection portion 111 is input to the display control portion 103 and the cooperative processing portion 113.

When the information of the selection result is input, the cooperative processing portion 113 starts the cooperative processing with the imaging device selected by the region sharing device selection portion 111, based on the input information of the selection result.

Note that, depending on a situation, a method for detecting the imaging devices that are capturing images of the same subject based on determining the intersection of the imaging regions may have a lower accuracy than the detection of the imaging devices based on image recognition. For example, when there are a plurality of imaging devices that are capturing a face of a person at the same time under similar conditions, if the imaging devices that are capturing images of the same subject are detected based on face recognition of the person, a better detection result may be obtained. In light of this, there is proposed a mechanism that simultaneously uses detection processing that is based on image recognition. This mechanism is achieved by a function of the image recognition portion 114.

The image recognition portion 114 acquires a captured image (or information indicating features of the image) from the imaging device selected by the region sharing device selection portion 111. Further, the image recognition portion 114 acquires an image captured by the imaging portion 101 from the storage portion 102. Then, the image recognition portion 114 cross-checks features of subjects appearing in both the acquired images, and determines whether or not a same subject is included in both the images. For example, the image recognition portion 114 performs face recognition on the acquired images and determines whether or not the same person's face is included in both the images. A determination result by the image recognition portion 114 is input to the cooperative processing portion 113.

When the determination result by the image recognition portion 114 is input, the cooperative processing portion 113 selects, from among the imaging devices selected by the region sharing device selection portion 111, the imaging device that has been determined to include the same subject based on the input determination result, and cooperates with the selected imaging device. The imaging devices are narrowed down by image recognition in this manner, and thus it is possible to more accurately detect the imaging device that is capturing an image of the same subject. Note that the image recognition portion 114 and the cooperative processing portion 113, which utilize images, may be configured to select and cooperate only with an imaging device corresponding to an image in which a ratio of an area occupied by the subject is a predetermined ratio or more. Alternatively, the image recognition portion 114 and the cooperative processing portion 113 may be configured to select and cooperate only with an imaging device corresponding to an image that includes a subject specified by the user.

The functional configuration of the imaging device 11 according to the present exemplary embodiment is described above. Note that the imaging devices 12 and 13 also have substantially the same configuration as that of the imaging device 11, or a configuration that is partially simplified as appropriate.

2-2-2: Operations

Figure 10:
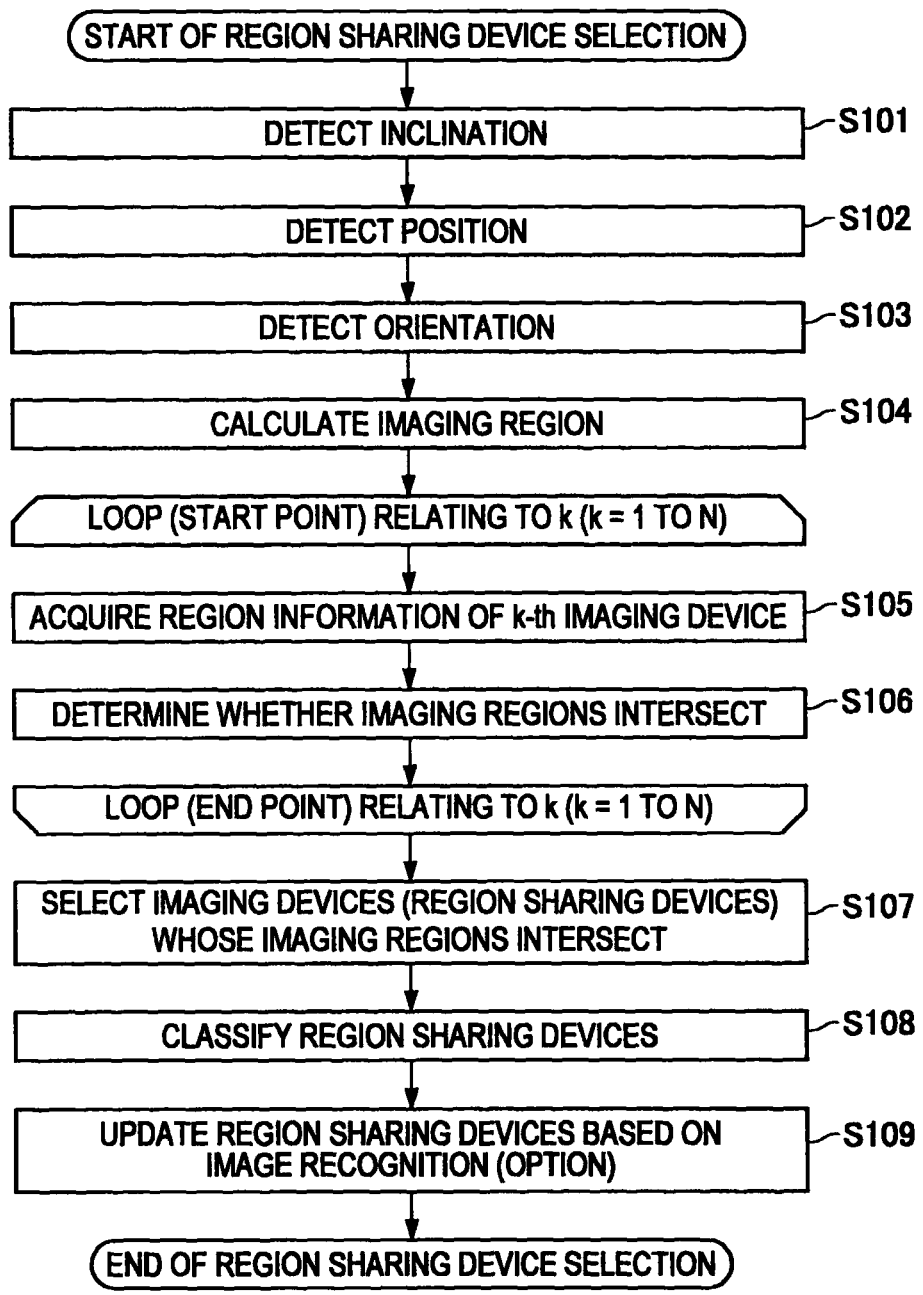
FIG. 10 is an explanatory diagram illustrating an operation example of the imaging device according to the first exemplary embodiment.

Next, operations of the imaging device 11 according to the present exemplary embodiment will be explained with reference to FIG. 10. FIG. 10 is an explanatory diagram illustrating the operations of the imaging device 11 according to the present exemplary embodiment. Here, among processes performed by the imaging device 11, processing that selects the imaging devices whose imaging regions intersect will be explained.

As shown in FIG. 10, first, the imaging device 11 detects an inclination of the imaging device 11 using the function of the inclination detection portion 105 (step S101). Then, the imaging device 11 detects a position of the imaging device 11 using the function of the position detection portion 106 (step S102). Then, the imaging device 11 detects an orientation of the imaging device 11 using the function of the direction detection portion 107 (step S103). The inclination information, the position information and the orientation information detected at step S101 to step S103 are input to the imaging region calculation portion 108. For example, the information shown in FIG. 11 (latitude, longitude, height, azimuthal angle, inclination angle, rotation angle, and the like) is input. Next, the imaging region calculation portion 108 calculates the imaging region using the input information (step S104).

Next, the imaging device 11 repeatedly performs processing at step S105 and step S106 that will be described later. First, the imaging device 11 detects imaging devices that exist in a neighboring area, using the function of the region information acquisition portion 109. Here, it is assumed that N imaging devices are detected (where N is the number of imaging devices). Then, the imaging device 11 acquires the region information from a k-th imaging device, using the function of the region information acquisition portion 109 (step S105). Then, the imaging device 11 determines whether or not the imaging region of the imaging device 11 intersects with the imaging region of the k-th imaging device, using the function of the region intersection determination portion 110 (step S106). After the processing at step S105 and step S106 is repeatedly performed for k=1 to N, the imaging device 11 advances the processing to step S107.

After advancing the processing to step S107, the imaging device 11 uses the function of the region sharing device selection portion 111 to select the imaging devices for which it is determined at step S106 that the imaging regions intersect (step S107). Next, the imaging device 11 classifies the imaging devices selected at step S107, using the function of the device classification portion 112 (step S108). For example, a group ID such as that shown in FIG. 11 is assigned to each of the imaging devices. Then, the imaging device 11 narrows down the imaging devices selected at step S107 by means of image recognition, using the functions of the image recognition portion 114 and the cooperative processing portion 113 (step S109). The series of processing is terminated.

The operations of the imaging device 11 according to the present exemplary embodiment are explained above. Note that processing sequences at step S101 to step S103 may be replaced with each other. Further, the processing at step S108 and step S109 may be omitted.

Furthermore, reference is made in the disclosed embodiments to "imaging regions" associated with one or more of imaging device 11, 12, and 13. In such embodiments, an imaging region for an imaging device may be calculated, e.g., by imaging region calculation portion 131, on the basis of an inclination of the imaging device, a spatial position of the imaging device, and an orientation of device imaging device. Such information may, in an embodiment, be received by imaging region calculation portion 131 and subsequently used to compute the imaging region. Furthermore, the exemplary processes may leverage the imaging regions associated with imaging device 11, 12, and 13 to identify a subset of these devices that are imaging a subject from corresponding positions, e.g., a rear of the building, or are imaging corresponding portions of a subject, e.g., an architectural feature of the building.

The disclosed embodiments are not limited to such exemplary linkages between imaging regions and corresponding device information. In additional embodiments, imaging regions associated with corresponding imaging devices may be obtain not from properties of these devices, but from images obtained from these devices. For example, images associated with corresponding image devices may be obtained via an image recognition unit (e.g., image recognition portion 114 of FIG. 16), and imaging regions corresponding to the imaging devices may be determined from corresponding portions of the obtained images. In such embodiments, device classification portion 112 may be leveraged to not only associated imaging devices, but to further associate images that include common portions and/or orientations of a subject.

The operations of the imaging device 11 according to the present exemplary embodiment are explained above. Note that processing sequences at step S101 to step S103 may be replaced with each other. Further, the processing at step S108 and step S109 may be omitted.

2-3: (Modified Example) Configuration of Imaging Device

Although the configuration of the imaging device 11 is explained above, the configuration of the imaging device 11 can also be modified in the following way. Here, an explanation will be given for a configuration that can also be applied when the imaging devices existing in the neighboring area of the imaging device 11 do not have a calculation function of the imaging region. Note that, a detailed explanation is omitted for structural elements that have substantially the same functions as those of the structural elements shown in FIG. 9.

2-3-1: Functional Configuration

Figure 12:
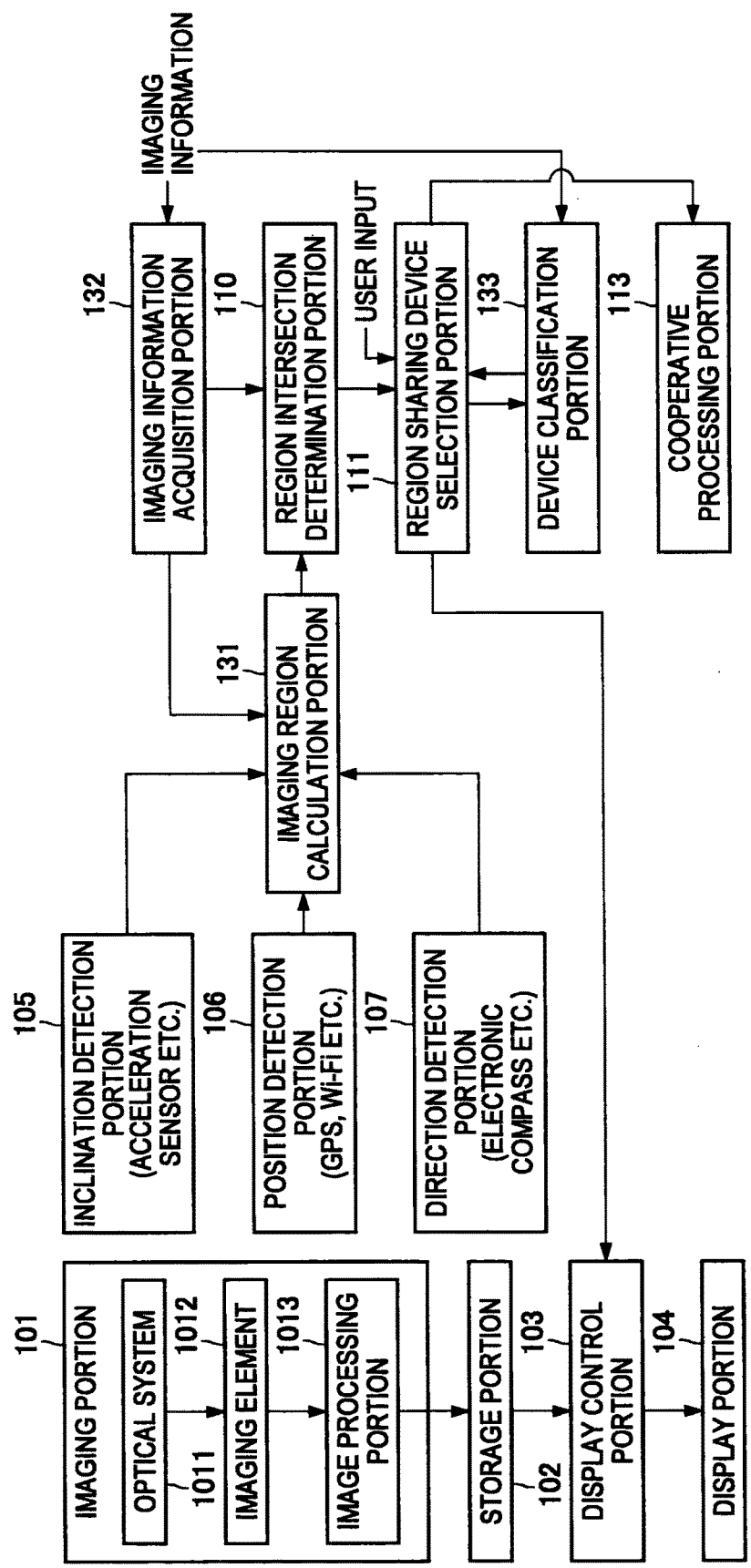
FIG. 12 is an explanatory diagram illustrating a functional configuration example of the imaging device according to the first exemplary embodiment.

First, a functional configuration of the imaging device 11 according to the modified example will be explained with reference to FIG. 12. FIG. 12 is an explanatory diagram illustrating the functional configuration of the imaging device 11 according to the modified example.

As shown in FIG. 12, the imaging device 11 includes the imaging portion 101, the storage portion 102, the display control portion 103 and the display portion 104. Further, the imaging device 11 includes the inclination detection portion 105, the position detection portion 106, the direction detection portion 107, an imaging region calculation portion 131, an imaging information acquisition portion 132, the region intersection determination portion 110, the region sharing device selection portion 111, a device classification portion 133 and the cooperative processing portion 113. The imaging portion 101 mainly includes the optical system 1011, the imaging element 1012 and the image processing portion 1013. Note that, although not explicitly shown in FIG. 12, the imaging device 11 further includes an input unit, a communication unit and the like.

Hereinafter, the functional configuration relating to processing that detects the imaging device with which the imaging device 11 is to cooperate will be explained.

First, the inclination detection portion 105 detects an inclination of the imaging device 11. Information of the inclination detected in this manner by the inclination detection portion 105 is input to the imaging region calculation portion 108. The position detection portion 106 detects position information of the imaging device 11. The position information detected by the position detection portion 106 is input to the imaging region calculation portion 108. The direction detection portion 107 detects an orientation of the imaging device 11. Information of the orientation detected by the direction detection portion 107 is input to the imaging region calculation portion 108.

As described above, the inclination information, the position information and the orientation information are input to the imaging region calculation portion 108. When these pieces of information are input, the imaging region calculation portion 131 calculates the imaging region using the input information. As already explained above, the imaging region is expressed by four or two straight lines that define a square pyramid or a triangle. The equations (refer to the above-described Equation (3) to Equation (8), for example) that indicate these straight lines are calculated from the focal distance that is determined by the optical system 1011, the size of the imaging element 1012, the position information, the inclination information and the orientation information. The information of the imaging region (region information) calculated in this manner is input to the region intersection determination portion 110. Note that the imaging region calculation portion 131 may be configured such that the region information is uploaded to an external server, such as a cloud system.

Next, the imaging information acquisition portion 132 detects imaging devices existing in the neighboring area. Here, an explanation will be given assuming that the imaging devices 12 and 13 are detected. When the imaging devices 12 and 13 are detected, the imaging information acquisition portion 132 acquires imaging information from the imaging devices 12 and 13. The imaging information is information to calculate the imaging region, namely, the inclination, the position and the orientation of the imaging device, the size of the imaging element, the focal distance, and the like. Note that detection of the imaging devices existing in the neighboring area and management of the imaging information may be performed by an external server, such as a cloud system. In this case, the imaging information acquisition portion 132 transmits the position information detected by the position detection portion 106 to the external server, and delegates the detection of the imaging devices existing in the neighboring area to the external server. Then, the imaging information acquisition portion 132 acquires, from the external server, the imaging information of the imaging devices 12 and 13 existing in the neighboring area.

The imaging information of the imaging devices 12 and 13 acquired in this manner is input to the imaging region calculation portion 131 and the device classification portion 133. When the imaging information is input, the imaging region calculation portion 131 calculates the imaging regions of the imaging devices 12 and 13 based on the input imaging information. The information of the imaging regions (region information) of the imaging devices 12 and 13 calculated by the imaging region calculation portion 131 is input to the region intersection determination portion 110.

When the region information is input, the region intersection determination portion 110 determines whether or not the imaging regions of the imaging devices 11, 12 and 13 intersect with each other, based on the input region information. First, the region intersection determination portion 110 determines whether or not the imaging region of the imaging device 11 intersects with the imaging region of the imaging device 12. Further, the region intersection determination portion 110 determines whether or not the imaging region of the imaging device 11 intersects with the imaging region of the imaging device 13. A determination result obtained in this manner is input to the region sharing device selection portion 111. Here, it is assumed that the imaging region of the imaging device 11 intersects with the imaging region of the imaging device 12.

When the determination result by the region intersection determination portion 110 is input, the region sharing device selection portion 111 selects, based on the input determination result, the imaging device (the imaging device 12) having the imaging region that intersects with the imaging region of the imaging device 11. Information of the selection result by the region sharing device selection portion 111 is input to the display control portion 103, the device classification portion 133 and the cooperative processing portion 113. The display control portion 103, into which the information of the selection result has been input, displays the input information of the selection result on the display portion 104. The device classification portion 133, into which the information of the selection result has been input, classifies the imaging device selected by the region sharing device selection portion 111, based on the input information of the selection result.

The user may want to select a particular imaging device only as a cooperation-target imaging device, from among the imaging devices that are sharing the imaging region. For example, the user may want to select only the imaging device that is performing image capture from the rear side of the subject. In such a case, the imaging device 11 utilizes the classification result by the device classification portion 133. For example, when the user performs an operation to select only the imaging device that is performing image capture from the rear side of the subject, the region sharing device selection portion 111 selects the imaging device that is performing image capture from the rear side of the subject, based on the classification result by the device classification portion 112. A result selected in this manner by the region sharing device selection portion 111 is input to the display control portion 103 and the cooperative processing portion 113.

When the information of the selection result is input, the cooperative processing portion 113 starts the cooperative processing with the imaging device selected by the region sharing device selection portion 111, based on the input information of the selection result.

The functional configuration of the imaging device 11 according to the modified example is described above. Note that the imaging devices 12 and 13 also have substantially the same configuration as that of the imaging device 11, or a configuration in which some of the structural elements are omitted as appropriate.

2-3-2: Operations

Figure 13:
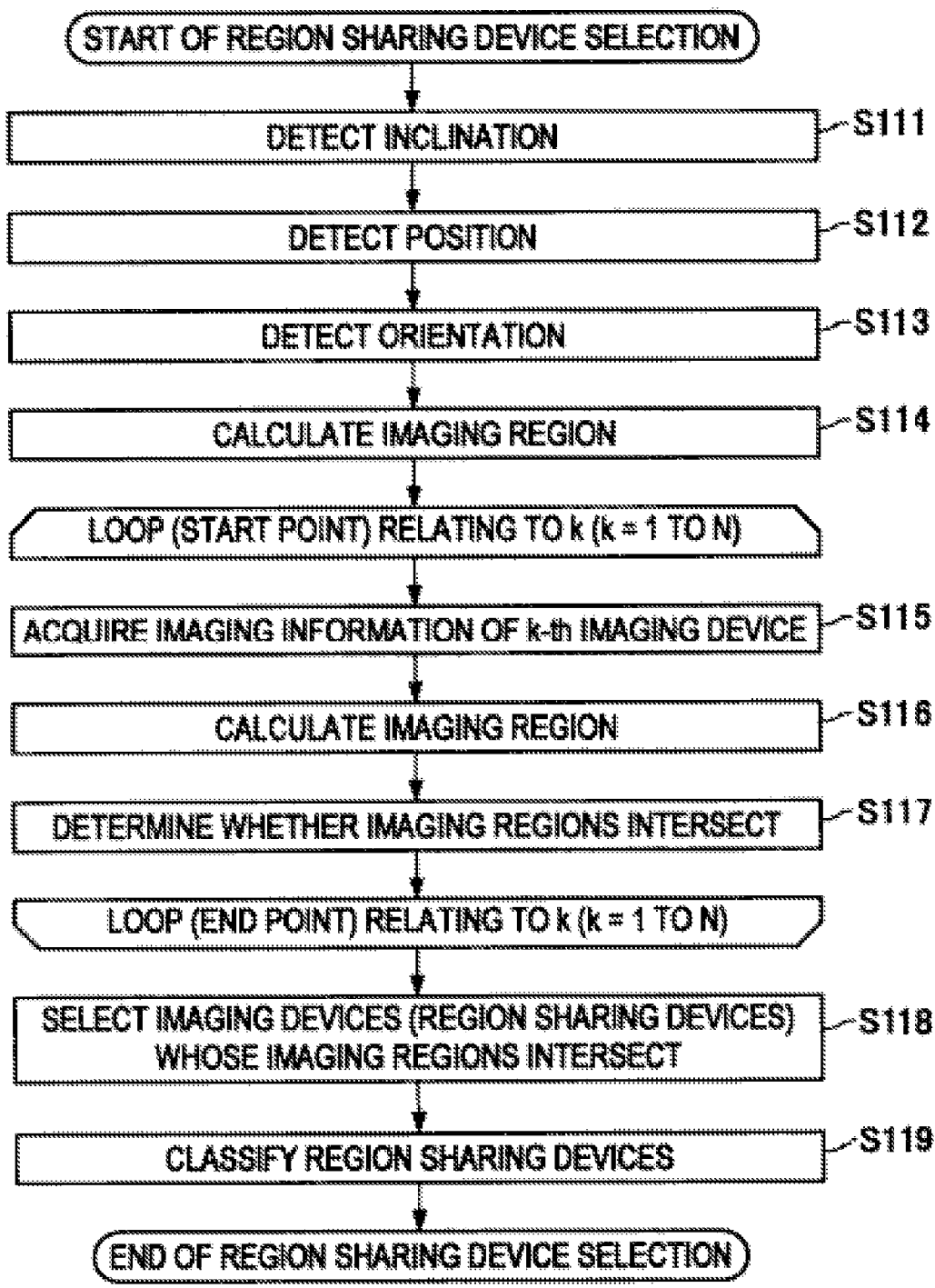
FIG. 13 is an explanatory diagram illustrating an operation example of the imaging device according to the first exemplary embodiment.

Next, operations of the imaging device 11 according to the modified example will be explained with reference to FIG. 13. FIG. 13 is an explanatory diagram illustrating the operations of the imaging device 11 according to the modified example. Here, among processes performed by the imaging device 11, processing that selects the imaging devices whose imaging regions intersect will be explained.

As shown in FIG. 13, first, the imaging device 11 detects an inclination of the imaging device 11 using the function of the inclination detection portion 105 (step S111). Then, the imaging device 11 detects a position of the imaging device 11 using the function of the position detection portion 106 (step S112). Then, the imaging device 11 detects an orientation of the imaging device 11 using the function of the direction detection portion 107 (step S113). The inclination information, the position information and the orientation information detected at step S111 to step S113 are input to the imaging region calculation portion 108. For example, the information shown in FIG. 11 (latitude, longitude, height, azimuthal angle, inclination angle, rotation angle, and the like) is input. Next, the imaging region calculation portion 108 calculates the imaging region using the input information (step S114).

Next, the imaging device 11 repeatedly performs processing at step S115 to step S117 that will be described later. First, the imaging device 11 detects imaging devices that exist in a neighboring area, using the function of the imaging information acquisition portion 132. Here, it is assumed that N imaging devices are detected (where N is the number of imaging devices). Then, the imaging device 11 acquires imaging information from a k-th imaging device, using the function of the imaging information acquisition portion 132 (step S115). Then, the imaging device 11 calculates the imaging region using the function of the imaging region calculation portion 131, based on the imaging information acquired at step S115 (step S116). Then, using the function of the region intersection determination portion 110, the imaging device 11 determines whether or not the imaging region of the imaging device 11 intersects with the imaging region of the k-th imaging device (step S117).

After the processing at step S115 to step S117 is repeatedly performed for k=1 to N, the imaging device 11 advances the processing to step S118. After advancing the processing to step S118, the imaging device 11 uses the function of the region sharing device selection portion 111 to select the imaging devices for which it is determined at step S117 that the imaging regions intersect (step S118). Next, the imaging device 11 classifies the imaging devices selected at step S118, using the function of the device classification portion 133 (step S119), and the series of processing is terminated. For example, the group ID such as that shown in FIG. 11 is assigned to each of the imaging devices.

The operations of the imaging device 11 according to the modified example are explained above. Note that processing sequences at step S111 to step S113 may be replaced with each other. Further, the processing at step S119 may be omitted.

Hereinabove, the first exemplary embodiment of the present technology is explained. The present exemplary embodiment relates to the configuration in which the imaging device 11 detects other imaging devices whose imaging regions intersect. However, it is also possible to modify the system configuration such that the processing that detects other imaging devices whose imaging regions intersect is delegated to an external server, such as a cloud system, and the series of processing is performed by the external server. If the system configuration is modified in this manner, it becomes possible to flexibly determine how to combine cooperation-target imaging devices and how they cooperate with each other. As a result, it is possible to further improve usability. Hereinafter, an exemplary embodiment relating to this type of modification will be explained.

3: Second Exemplary Embodiment

Hereinafter, the second exemplary embodiment of the present technology will be explained. The present exemplary embodiment relates to a mechanism in which imaging region information is uploaded from each of the imaging devices to an information processing system, such as a cloud system, and the imaging region information is effectively used by the information processing system. Note that structural elements that have substantially the same functions as those of the above-described first exemplary embodiment are denoted with the same reference numerals and a detailed explanation thereof is omitted.

3-1: System Configuration

First, the system configuration that is assumed in the present exemplary embodiment will be explained with reference to FIG. 14. FIG. 14 is an explanatory diagram illustrating the system configuration that is assumed in the present exemplary embodiment. This system achieves a function which detects a set of imaging devices having imaging regions that intersect with each other, from among a plurality of imaging devices located in a neighboring area, and which allows cooperation between the set of imaging devices.

Figure 14:
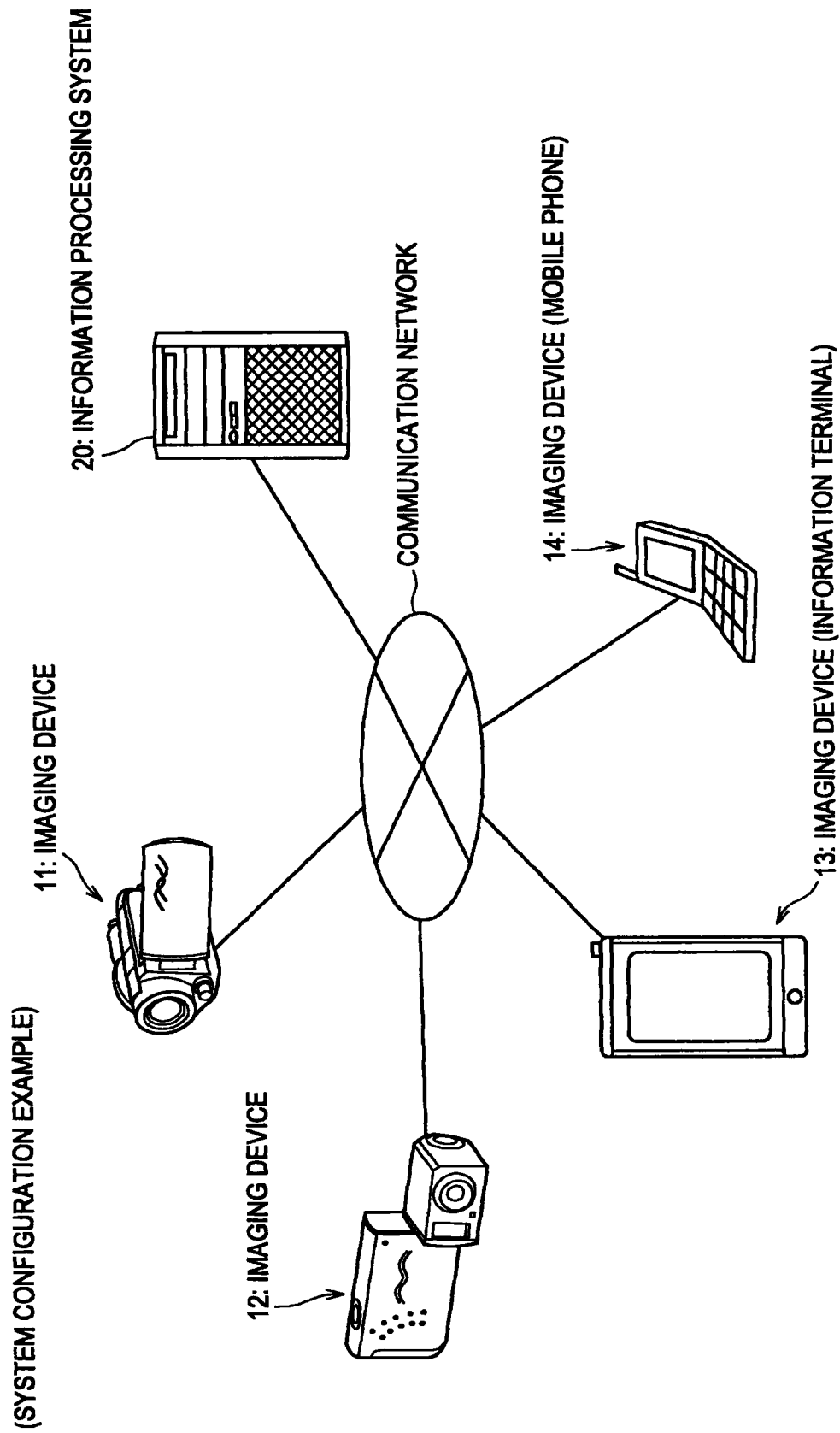
FIG. 14 is an explanatory diagram illustrating an example of a system configuration that is assumed in a second exemplary embodiment.

For example, as shown in FIG. 14, it is assumed that the imaging devices 11, 12, 13 and 14, and an information processing system 20 exist in the system, and they are mutually connected by a communication network. First, the information processing system 20 collects position information that is acquired by each of the imaging devices 11, 12, 13 and 14 using GPS or the like, and selects a set of imaging devices located in the neighboring area from a positional relationship between them. Here, it is assumed that the imaging devices 12 and 13 are selected as the set of imaging devices existing in the neighboring area. When the imaging devices 12 and 13 are detected, the information processing system 20 acquires information of imaging regions (region information) from the imaging devices 12 and 13.

Note that the imaging regions of the imaging devices 12 and 13 may be calculated respectively by the imaging devices 12 and 13. Alternatively, the information processing system 20 may calculate the imaging regions of the imaging devices 12 and 13 using the imaging information collected from the imaging devices 12 and 13. Here, it is assumed that the imaging devices 12 and 13 respectively calculate the imaging regions. When the region information is acquired from the imaging devices 12 and 13, the information processing system 20 determines, based on the acquired region information, whether or not the imaging regions of the imaging devices 12 and 13 intersect with each other. In summary, the information processing system 20 detects existence of the common imaging region. When the imaging regions of the imaging devices 12 and 13 intersect with each other, the information processing system 20 causes the imaging devices 12 and 13 to cooperate with each other.

The system configuration that is assumed in the present exemplary embodiment is explained above. Hereinafter, the configurations of the imaging device and the information processing system 20 will be explained in more detail. Note that, although the explanation below will be given focusing on the imaging device 11, the imaging devices 12 and 13 may also have substantially the same configuration as that of the imaging device 11, or a configuration that is partially simplified.

3-2: Configuration of Imaging Device

Figure 15:
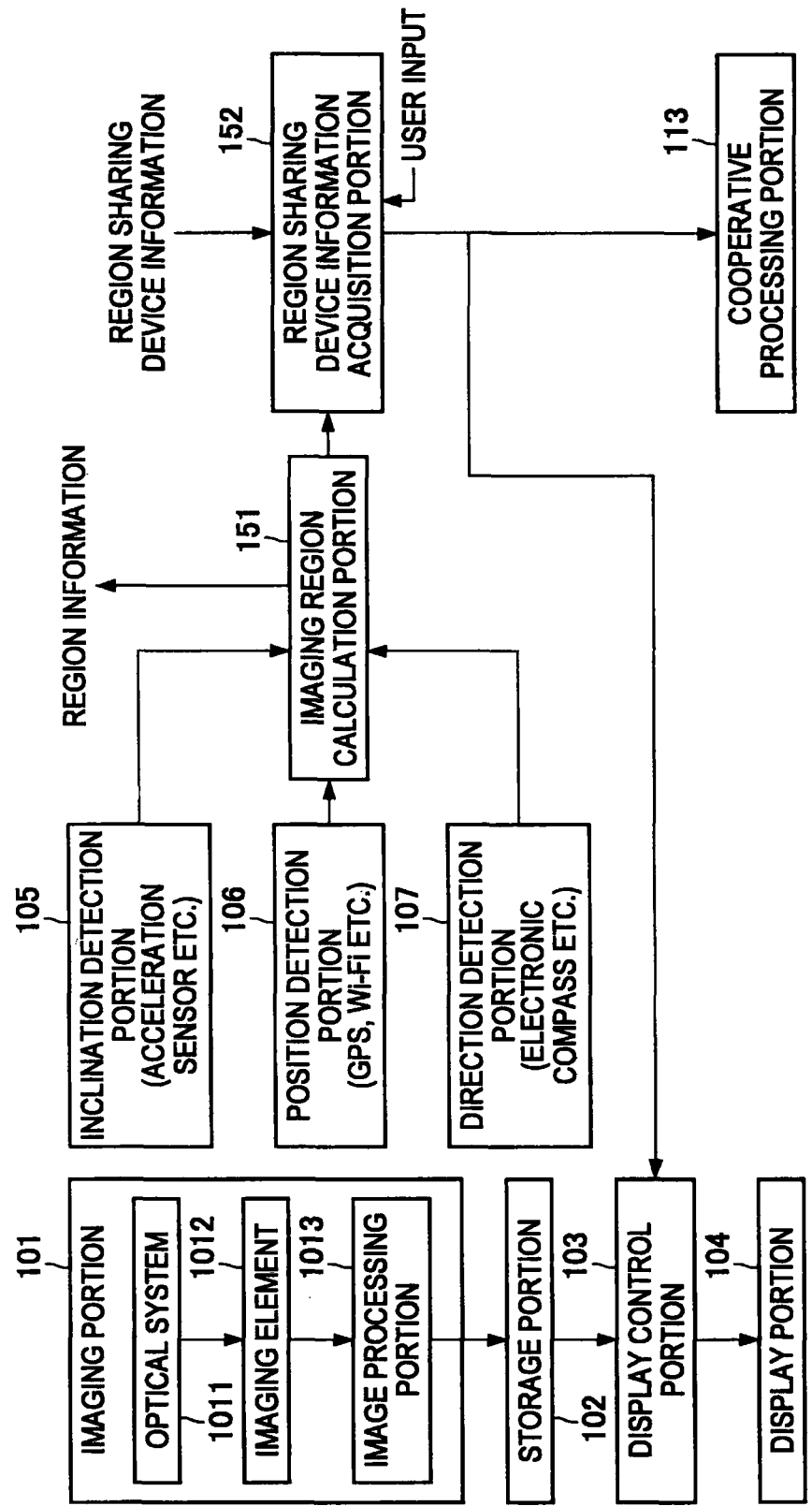
FIG. 15 is an explanatory diagram illustrating a functional configuration example of an imaging device according to the second exemplary embodiment.

First, a functional configuration of the imaging device 11 according to the second exemplary embodiment will be explained with reference to FIG. 15. FIG. 15 is an explanatory diagram illustrating the functional configuration of the imaging device 11 according to the present exemplary embodiment.

As shown in FIG. 15, the imaging device 11 includes the imaging portion 101, the storage portion 102, the display control portion 103 and the display portion 104. Further, the imaging device 11 includes the inclination detection portion 105, the position detection portion 106, the direction detection portion 107, an imaging region calculation portion 151, a region sharing device information acquisition portion 152 and the cooperative processing portion 113. The imaging portion 101 mainly includes the optical system 1011, the imaging element 1012 and the image processing portion 1013. Note that, although not explicitly shown in FIG. 15, the imaging device 11 further includes an input unit, a communication unit and the like.

The inclination detection portion 105 detects an inclination of the imaging device 11. Information of the inclination detected in this manner by the inclination detection portion 105 is input to the imaging region calculation portion 151. The position detection portion 106 detects position information of the imaging device 11. The position information detected by the position detection portion 106 is input to the imaging region calculation portion 151. The direction detection portion 107 detects an orientation of the imaging device 11. Information of the orientation detected by the direction detection portion 107 is input to the imaging region calculation portion 151.

As described above, the inclination information, the position information and the orientation information are input to the imaging region calculation portion 151. When these pieces of information are input, the imaging region calculation portion 151 calculates the imaging region using the input information. As already explained above, the imaging region is expressed by four or two straight lines that define a square pyramid or a triangle. The equations (refer to the above-described Equation (3) to Equation (8), for example) that indicate these straight lines are calculated from the focal distance that is determined by the optical system 1011, the size of the imaging element 1012, the position information, the inclination information and the orientation information. The information of each of the imaging regions (region information) calculated in this manner is uploaded to the information processing system 20.

Next, the region sharing device information acquisition portion 152 acquires, from the information processing system 20, information of the imaging devices having the imaging regions that intersect with the imaging region of the imaging device 11. Here, an explanation will be given assuming that information of the imaging devices 12 and 13 is acquired. The information of the imaging devices 12 and 13 acquired by the region sharing device information acquisition portion 152 is input to the cooperative processing portion 113. The cooperative processing portion 113, into which the information of the imaging devices 12 and 13 has been input, starts cooperation with the imaging devices 12 and 13 based on the input information. Note that, when content of the cooperative processing is notified from the information processing system 20, the cooperative processing portion 113 performs the cooperative processing based on the notified content.

The functional configuration of the imaging device 11 according to the present exemplary embodiment is explained above. Note that the imaging devices 12 and 13 also have substantially the same configuration as that of the imaging device 11, or a configuration in which some of the structural elements are omitted as appropriate.

3-3: Configuration of Information Processing System

Figure 16:
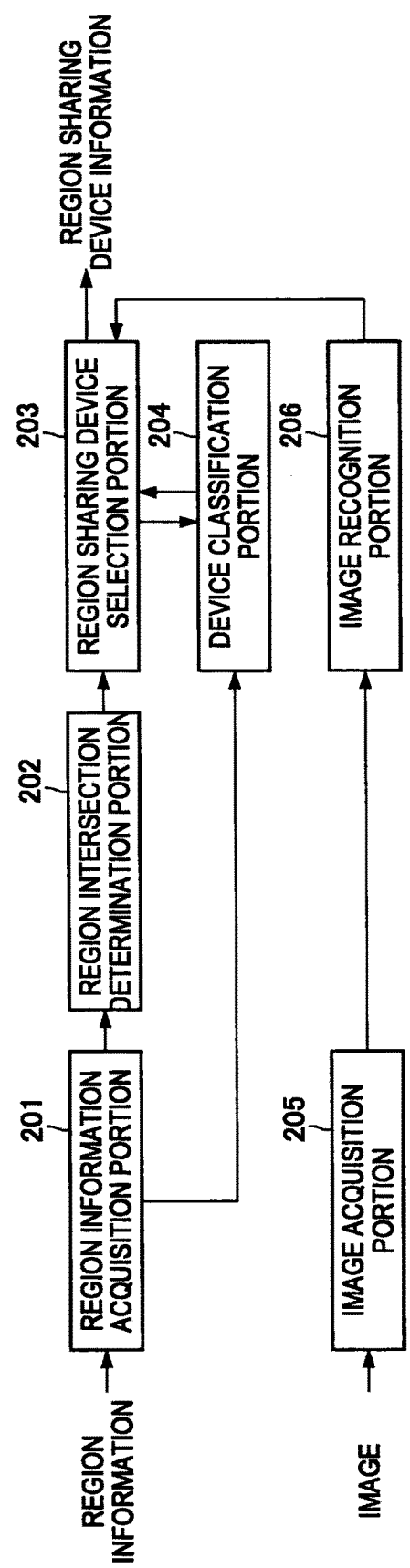
FIG. 16 is an explanatory diagram illustrating a functional configuration example of an information processing system according to the second exemplary embodiment.

Next, a functional configuration of the information processing system 20 according to the second exemplary embodiment will be explained with reference to FIG. 16. FIG. 16 is an explanatory diagram illustrating the functional configuration of the information processing system 20 according to the present exemplary embodiment.

As shown in FIG. 16, the information processing system 20 mainly includes a region information acquisition portion 201, a region intersection determination portion 202, a region sharing device selection portion 203, a device classification portion 204, an image acquisition portion 205 and an image recognition portion 206 (that being an example of an image recognition unit).

First, the region information acquisition portion 201 detects a set of imaging devices existing in a neighboring area. Here, an explanation will be given assuming that the imaging devices 12 and 13 are detected. When the imaging devices 12 and 13 are detected, the region information acquisition portion 201 acquires region information from the imaging devices 12 and 13. The region information of the imaging devices 12 and 13 acquired in this manner is input to the region intersection determination portion 202 and the device classification portion 204. When the region information is input, the region intersection determination portion 202 determines, based on the input region information, whether or not the imaging regions of the imaging devices 12 and 13 intersect with each other. A determination result determined in this manner is input to the region sharing device selection portion 203. Here, an explanation will be given assuming that it is determined that the imaging region of the imaging device 12 intersects with the imaging region of the imaging device 13.

When the determination result by the region intersection determination portion 202 is input, the region sharing device selection portion 203 selects, based on the input determination result, the imaging devices 12 and 13 whose imaging regions intersect with each other. Information of the selection result by the region sharing device selection portion 203 is input to the device classification portion 204. When the information of the selection result is input, the device classification portion 204 classifies the imaging devices 12 and 13 selected by the region sharing device selection portion 203, based on the input information of the selection result.

For example, in accordance with a distance from the subject, a distance between the imaging devices, and an imaging direction, the device classification portion 204 classifies the imaging devices 12 and 13 selected by the region sharing device selection portion 203. Note that the distance from the subject can be estimated by the distance between the position of the classification-target imaging device and the imaging surface. Further, the distance between the imaging devices can be estimated based on the position information of each of the imaging devices. The imaging direction can be estimated from the orientation of each of the imaging devices. A classification result by the device classification portion 204 is input to the region sharing device selection portion 203. For example, information of the imaging device that is performing image capture from the front side of the subject is input to the region sharing device selection portion 203.

The user may want to select a particular imaging device only as a cooperation-target imaging device, from among the imaging devices that are sharing the imaging region. For example, the user may want to select only the imaging device that is performing image capture from the rear side of the subject. In such a case, the information processing system 20 utilizes the classification result by the device classification portion 204. For example, when the user requests to select only the imaging device that is performing image capture from the rear side of the subject, the region sharing device selection portion 203 selects the imaging device that is performing image capture from the rear side of the subject, based on the classification result by the device classification portion 204. Information (region sharing device information) of the imaging device selected in this manner by the region sharing device selection portion 203 is transmitted to the imaging device that is selected as a cooperation target.

Note that, depending on a situation, the method for detecting the imaging devices that are capturing images of the same subject based on determining the intersection of the imaging regions may have a lower accuracy than the detection of the imaging devices based on image recognition. For example, when there are a plurality of imaging devices that are capturing a face of a person at the same time under similar conditions, if the imaging devices that are capturing images of the same subject are detected based on face recognition of the person, a better detection result may be obtained. In light of this, there is proposed a mechanism that simultaneously uses detection processing that is based on image recognition. This mechanism is achieved by a function of the image acquisition portion 205 and a function of the image recognition portion 206.

The image acquisition portion 205 acquires, from the imaging devices selected by the region sharing device selection portion 203, images that are being captured by the imaging devices. The images acquired by the image acquisition portion 205 are input to the image recognition portion 206. The image recognition portion 206 cross-checks features of subjects appearing in the images acquired from the respective imaging devices, and determines whether or not a same subject is included in the images. For example, the image recognition portion 206 performs face recognition on the images acquired from the respective imaging devices and determines whether or not the same person's face is included in the images. A determination result by the image recognition portion 206 is input to the region sharing device selection portion 203.

When the determination result by the image recognition portion 206 is input, based on the input determination result, the region sharing device selection portion 203 narrows down the selection result to the imaging devices whose images are determined to include the same subject. The imaging devices are narrowed down by image recognition in this manner, and thus it is possible to more accurately detect the imaging devices that are capturing images of the same subject. Note that, the image recognition portion 206 and the cooperative processing portion 203, which utilize images, may be configured to select only an imaging device corresponding to an image in which a ratio of an area occupied by the subject is a predetermined ratio or more. Alternatively, the image recognition portion 206 and the cooperative processing portion 203 may be configured to select only an imaging device corresponding to an image that includes a subject specified by the user.

Hereinabove, the functional configuration of the information processing system 20 according to the present exemplary embodiment is explained. Note that the information processing system 20 may have a function that notifies imaging devices of content of the cooperative processing. Further, the information processing system 20 may have a function that provides map information to the user, or displays cooperation-target imaging devices on a map. Other than the above-described functions, it is also possible to add various functions to the information processing system 20. Hereinafter, examples of functions that can be added to the information processing system 20 will be explained.

3-4: Functional Details

Hereinafter, a function that assigns tags to the imaging devices and a mapping function of the imaging devices will be explained as functions that can be added to the information processing system 20. Further, simultaneous use of image recognition technology will be explained in more detail.

3-4-1: Assignment of Various Tags

First, the function that assigns tags to the imaging devices will be explained with reference to FIG. 17 to FIG. 19. This function is achieved mainly by utilizing the function of the device classification portion 204, among the functions of the information processing system 20. Note that, in an example that will be explained here, a tag is assigned to the imaging device 11. However, this also applies to a case in which tags are assigned to the imaging devices 12, 13, 14 and the like.

Overall Processing Flow

Figure 17:
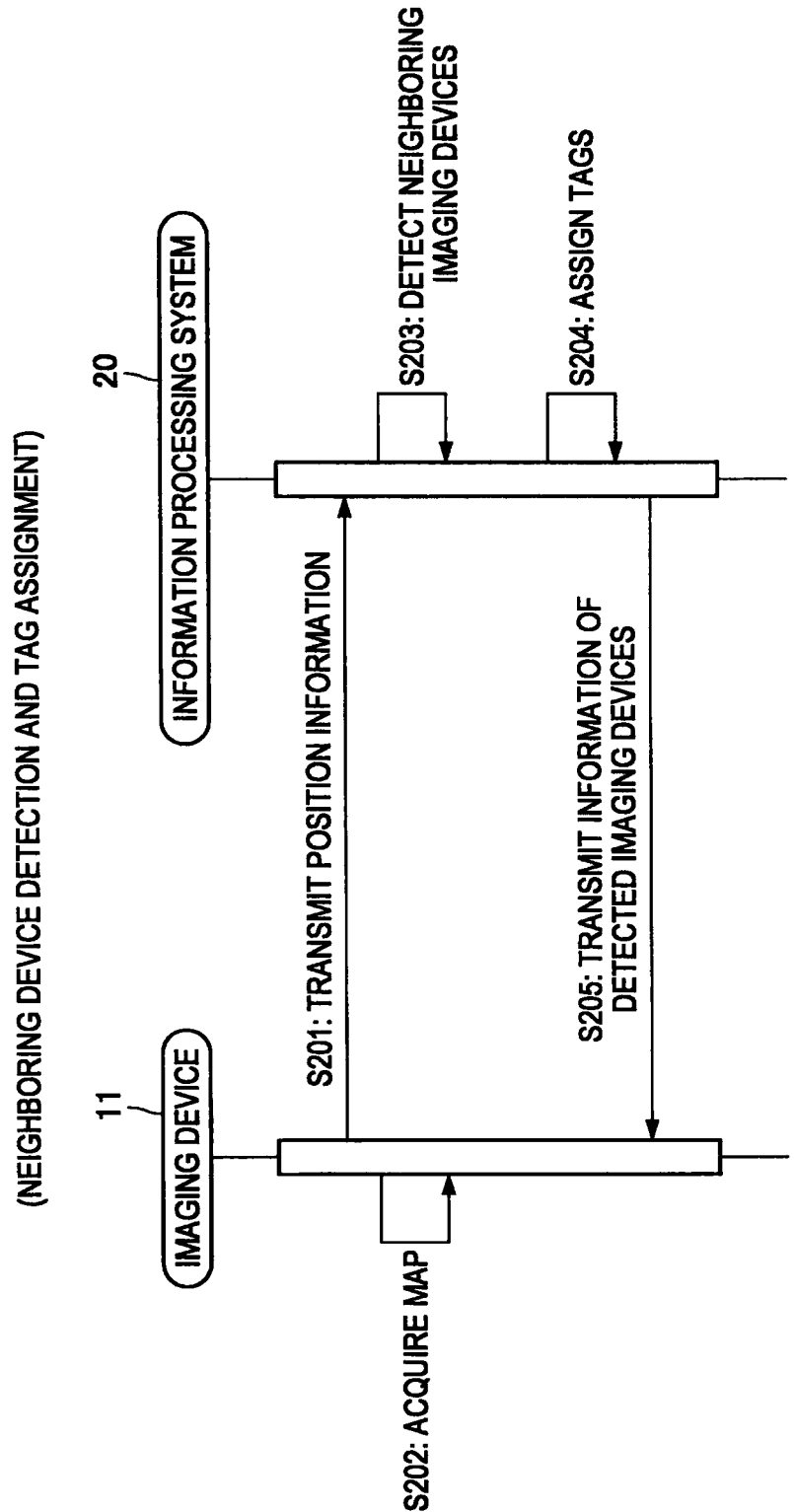
FIG. 17 is an explanatory diagram illustrating a method for detecting neighboring devices and a method for assigning tags according to the second exemplary embodiment.

As shown in FIG. 17, first, the imaging device 11 transmits position information to the information processing system 20 (step S201). Further, the imaging device 11 acquires map information (step S202). For example, the imaging device 11 reads out the map information that is stored in advance in the storage portion 102, or acquires the map information using an external map information providing service. Meanwhile, when the information processing system 20 receives the position information from the imaging device 11, the information processing system 20 detects imaging devices existing in the vicinity of the received position information (step S203). Next, the information processing system 20 assigns tags to the imaging devices detected at step 5203 (step S204). Next, the information processing system 20 transmits, to the imaging device 11, information of the imaging devices detected at step S203 (step S205).

Details of Step S203

Here, the processing at step S203 will be explained in more detail with reference to FIG. 18.

Figure 18:
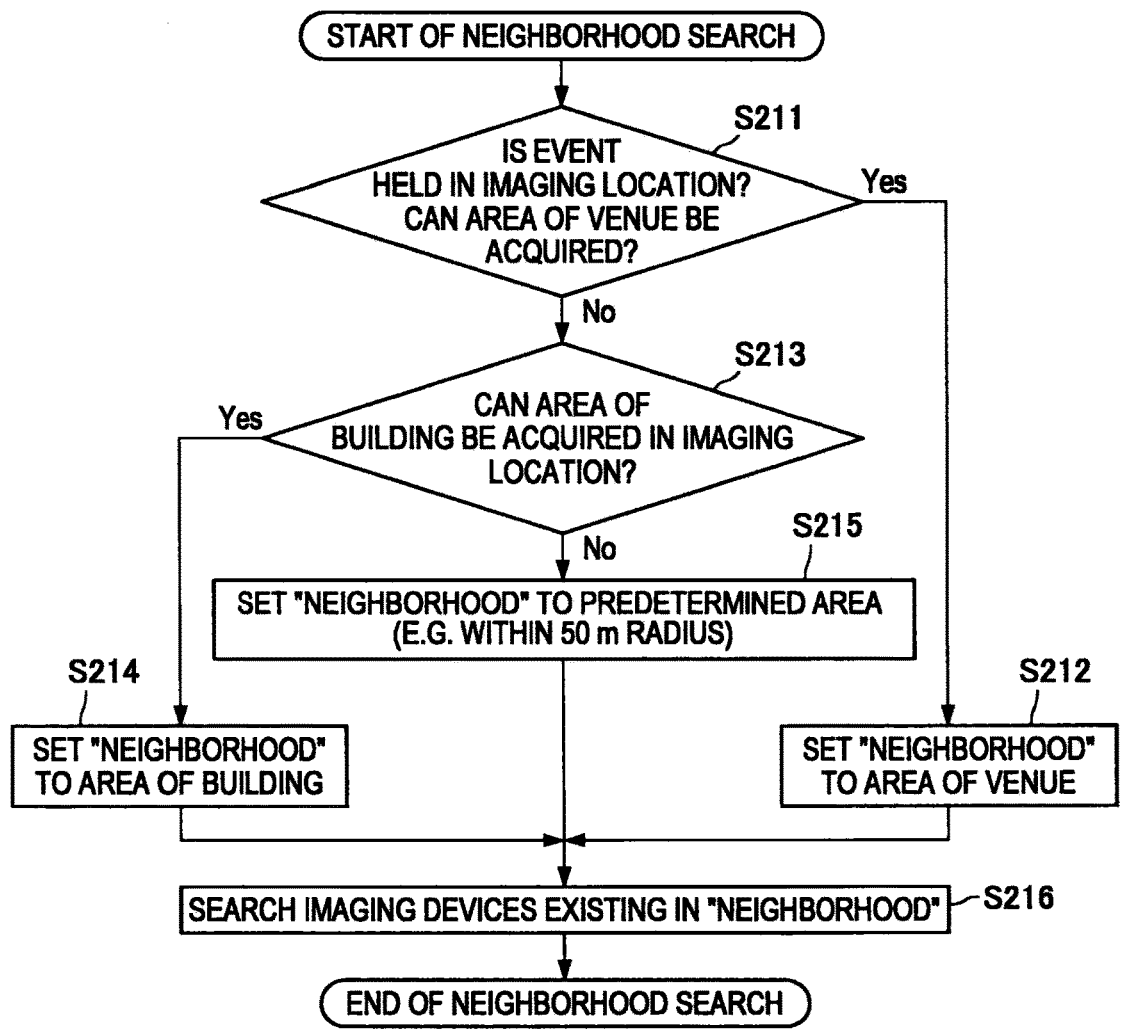
FIG. 18 is an explanatory diagram illustrating the method for detecting neighboring devices according to the second exemplary embodiment.

When the processing at step 5203 is started, as shown in FIG. 18, the information processing system 20 starts a search (hereinafter referred to as a neighborhood search) for imaging devices existing in the vicinity of a location (hereinafter referred to as an imaging location) indicated by the received position information. First, the information processing system 20 determines whether or not an event is being held at the imaging location (step S211). When the event is being held at the imaging location, the information processing system 20 determines whether or not it is possible to acquire an area of the venue location (step S211). When the event is not being held at the imaging location or when it is difficult to acquire the area of the venue location, the information processing system 20 advances the processing to step S213. On the other hand, when the event is being held at the imaging location and it is possible to acquire the area of the venue location, the information processing system 20 advances the processing to step S212.

When the information processing system 20 advances the processing to step S212, the information processing system 20 acquires the area of the venue location, sets the acquired venue location as a "neighborhood" (step S212), and advances the processing to step S216. On the other hand, when the information processing system 20 advances the processing to step S213, the information processing system 20 determines whether or not it is possible to acquire an area of a building that is located at the imaging location (step S213). When it is possible to acquire the area of the building, the information processing system 20 advances the processing to step S214. On the other hand, when it is difficult to acquire the area of the building, the information processing system 20 advances the processing to step S215.

Figure 21:
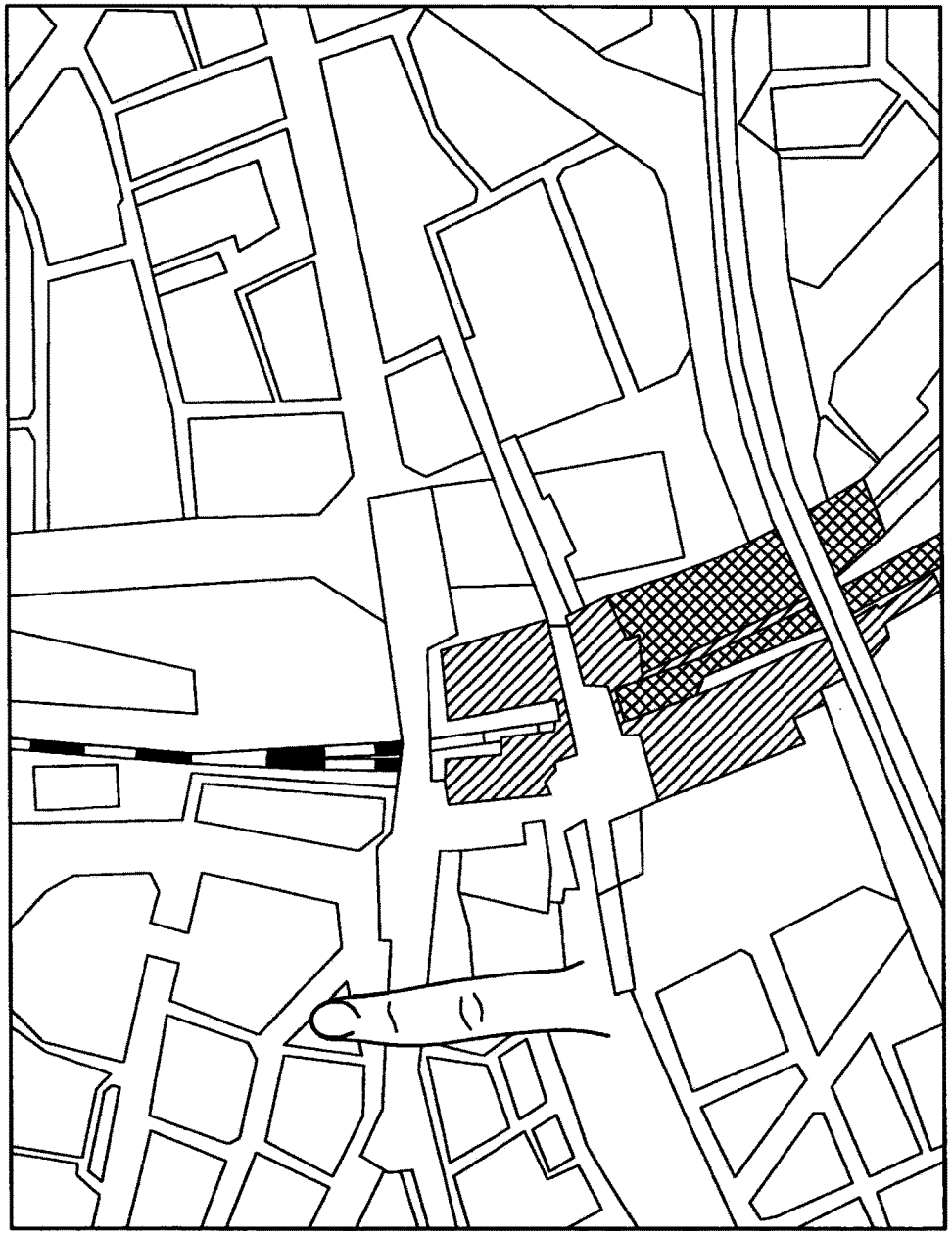
FIG. 21 is an explanatory diagram illustrating a method for a user to specify a location that is used as a reference when performing neighboring device detection according to the second exemplary embodiment.

When the information processing system 20 advances the processing to step S214, the information processing system 20 acquires the area of the building, sets the acquired area of the building as the "neighborhood" (step S214), and advances the processing to step S216. On the other hand, when the information processing system 20 advances the processing to step S215, the information processing system 20 sets a predetermined area (for example, an area within a 50 m radius) as the "neighborhood" (step S215), and advances the processing to step S216. When the information processing system 20 advances the processing to step S216, the information processing system 20 searches for imaging devices existing in the area determined as the "neighborhood" (step S216), and ends the series of processing relating to neighborhood search. Note that, although in the above explanation, the imaging location is used as a reference to set the "neighborhood", a location that is input by the user may be used as the reference, as shown in FIG. 21.

Details of Step S204

Next, the processing at step S204 will be explained in more detail with reference to FIG. 19. Note that, when the processing at step S204 is completed, tags are assigned to the respective imaging devices, as shown in FIG. 20.

Figure 19:
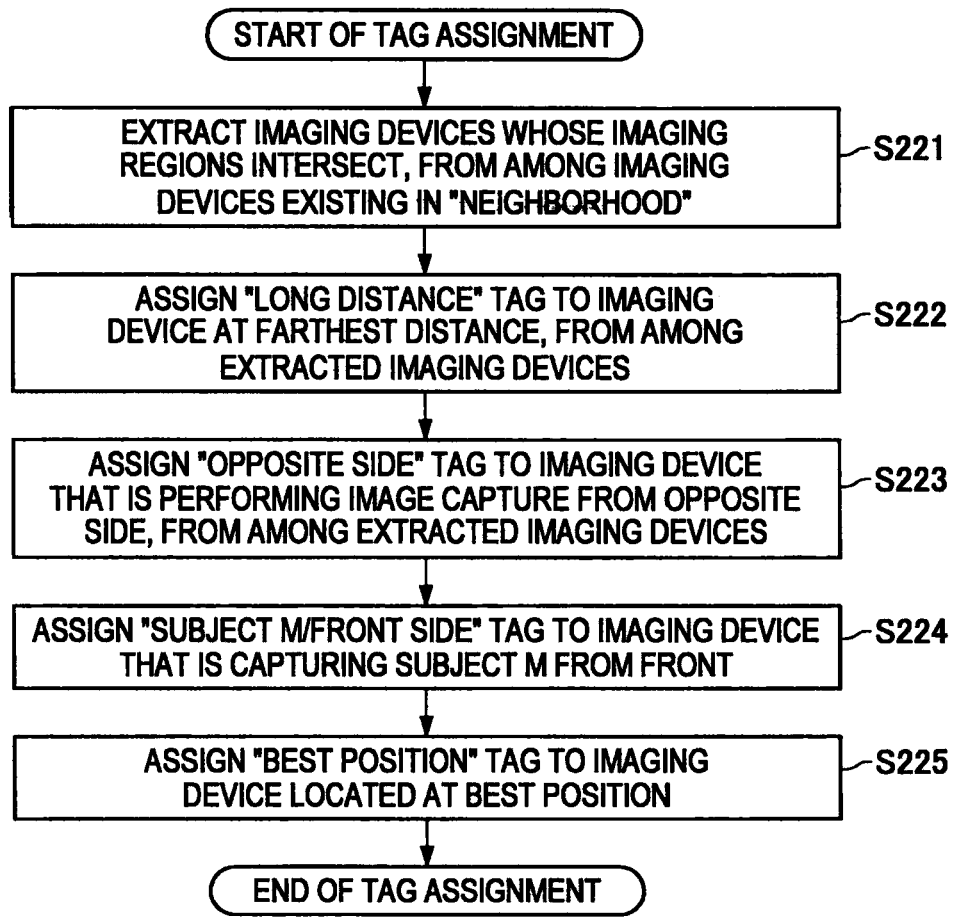
FIG. 19 is an explanatory diagram illustrating the method for assigning tags according to the second exemplary embodiment.

When the processing at step 5204 is started, as shown in FIG. 19, the information processing system 20 extracts, from among the imaging devices existing in the "neighborhood", imaging devices whose imaging regions intersect with each other (step S221). Next, the information processing system 20 assigns a "long distance" tag to an imaging device at the farthest distance from the imaging location, among the imaging devices extracted at step S221 (step S222). Next, the information processing system 20 assigns an "opposite side" tag to an imaging device that is performing image capture from the opposite side of the imaging location, among the imaging devices extracted at step S221 (step S223).

Next, the information processing system 20 assigns a "subject M/front side" tag to an imaging device that is capturing the subject M from the front (step S224). At this time, if the subject M is a person, a "person M/front side" tag is assigned. Next, the information processing system 20 assigns a "best position" tag to an imaging device located at the best position (step S225). At this time, the information processing system 20 assigns the "best position" tag using an information source, such as the Internet, or rating information by users. For example, a "Tokyo sky tree/best position" tag or the like is assigned. After completion of the processing at step S225, the information processing system 20 ends the series of processing relating to tag assignment.

The function relating to tag assignment is explained above.

3-4-2: Mapping of Neighboring Devices

Next, a function that performs mapping of the imaging devices existing in the "neighborhood" on a map will be explained with reference to FIG. 22.

Figure 22:
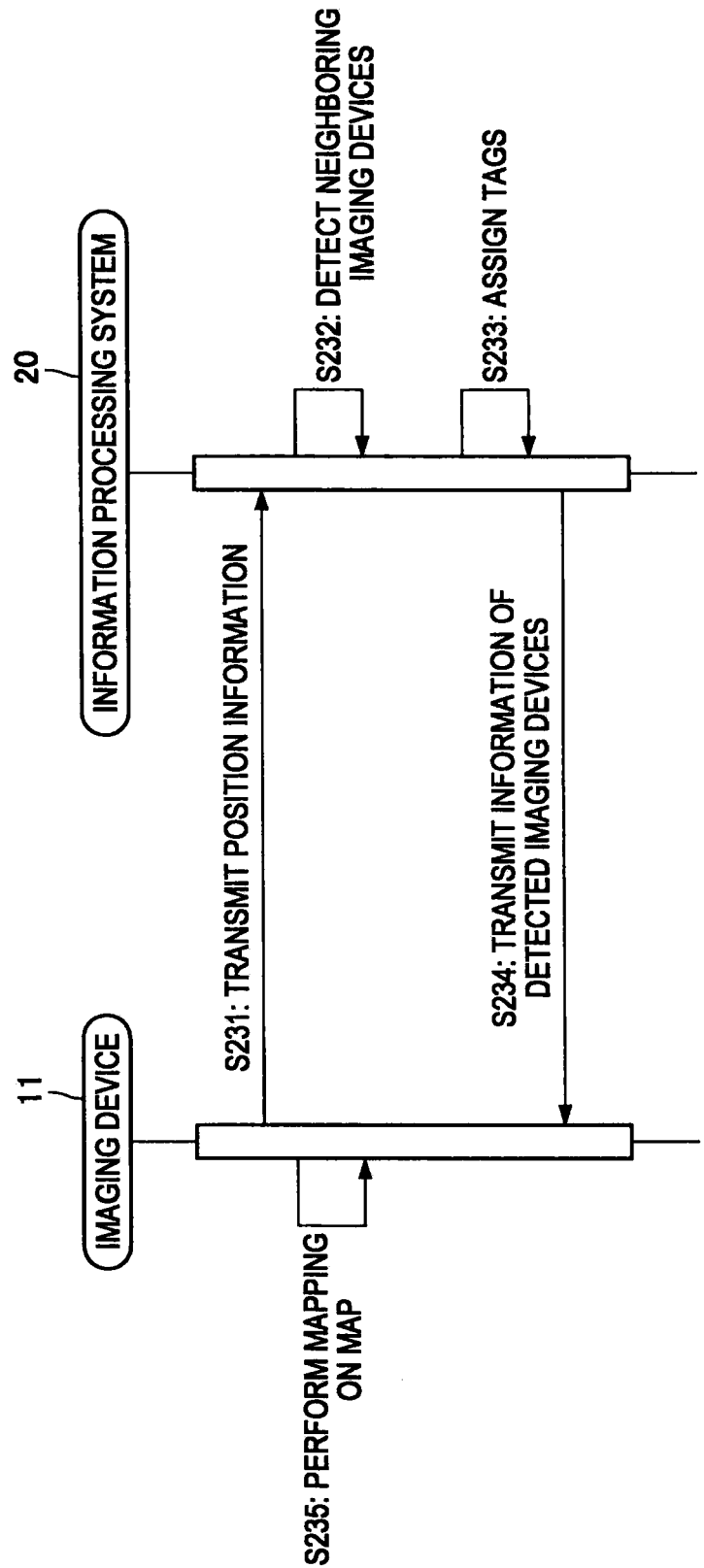
FIG. 22 is an explanatory diagram illustrating a method for mapping, on a map, a result of performing neighboring device detection according to the second exemplary embodiment.

As shown in FIG. 22, first, the imaging device 11 transmits position information to the information processing system 20 (step S231). When the position information is received from the imaging device 11, the information processing system 20 detects imaging devices existing in the vicinity of the imaging location (step S232). At this time, the imaging devices existing in the "neighborhood" are detected by the neighborhood search, which has already been explained. Next, the information processing system 20 assigns tags to the imaging devices detected at step S232 (step S233). Next, the information processing system 20 transmits information (position information) of the imaging devices detected at step S232 to the imaging device 11 (step S234). When the imaging device 11 receives from the information processing system 20 the position information of the imaging devices existing in the neighborhood, the imaging device 11 maps the positions of the imaging devices existing in the neighborhood on the map, based on the received position information (step S235), and ends the series of processing.

The function that performs mapping of the imaging devices existing in the neighborhood on the map is explained above.

3-4-3: Assignment of Best Position Tag

Next, the function that assigns the best position tag will be explained in more detail with reference to FIG. 23. The term "best position tag" used herein indicates a tag that is assigned to the imaging device at the best position for the user. For example, the information processing system 20 holds a database, an example of which is shown in FIG. 23, and utilizes information stored in the database to determine the imaging device to which the best position tag should be assigned.

For example, let consider the best position for a user who is watching sport. The user who is watching sport, such as baseball or soccer, is likely to pay attention to his or her favorite player. Therefore, it can be said that an imaging device that is tracking and capturing the player who attracts the user's attention is the imaging device to which the best position tag should be assigned. On the other hand, it can also be said that an imaging device that is providing video that is viewed by a lot of users at the same time is the imaging device to which the best position tag should be assigned. Further, it can also said that an imaging device that is providing video that is highly evaluated by users is the imaging device to which the best position tag should be assigned.

Given this, the information processing system 20 performs matching between position information of players and the imaging region, and records the captured players for each of the imaging devices. Note that the database may be updated in real time. A fixed value may be assigned to information relating to the imaging device that tracks a particular player. Further, the information processing system 20 acquires the number of users who are viewing at the same time (hereinafter referred to as the number of simultaneous viewers) and records the number of simultaneous viewers in the database. Further, the information processing system 20 records a rating for each of the imaging devices (or provided video). These pieces of information in the database may also be updated in real time. Then, based on the database, the information processing system 20 assigns the best position tag to the target imaging device.

3-4-4: Simultaneous Use of Image Recognition Technology

Here, a method for simultaneously using image recognition technology will be explained with reference to FIG. 24 and FIG. 25. Note that the method for simultaneously using image recognition technology is also described in the explanation of the above-described first exemplary embodiment. Here, an explanation will be given for a method in which the information processing system 20 uses the image recognition technology to detect a set of imaging devices that are capturing the same subject.

Overall Processing Flow

Figure 24:
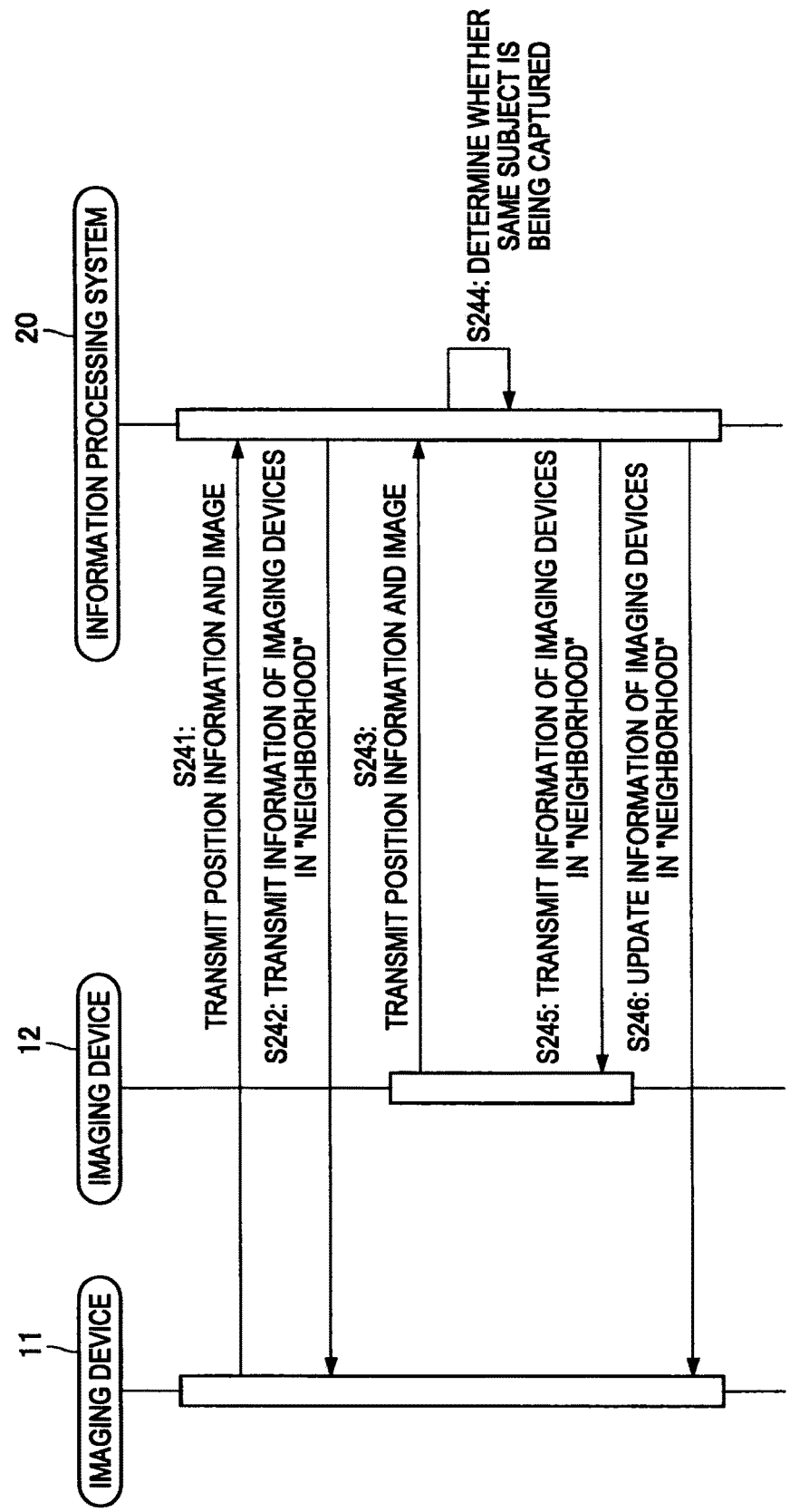
FIG. 24 is an explanatory diagram illustrating a method of simultaneous use of image recognition according to the second exemplary embodiment.

First, FIG. 24 is referred to. Here, an explanation will be given assuming that the imaging devices 11 and 12 are located close to each other. As shown in FIG. 24, first, the imaging device 11 transmits position information and an image to the information processing system 20 (step S241). When the position information and the image are received from the imaging device 11, the information processing system 20 transmits to the imaging device 11 information of imaging devices located in the vicinity of a location indicated by the received position information (step S242). In this case, the information of the imaging devices including information of the imaging device 12 is transmitted to the imaging device 11.

The imaging device 12 transmits position information and an image to the information processing system 20 (step S243). When the position information and the image of the imaging device 12 are received, the information processing system 20 determines whether or not the imaging devices 11 and 12 are capturing the same subject (step S244). At this time, the information processing system 20 determines whether or not the imaging region of the imaging device 11 intersects with the imaging region of the imaging device 12. Further, the information processing system 20 compares features of the image received from the imaging device 11 with features of the image received from the imaging device 12, and thereby determines whether or not the same subject is being captured. For example, the information processing system 20 compares the features of the images using a shape recognition technology described in Japanese Patent Application Publication No. JPA-2008-154192, and a face recognition technology Further, the information processing system 20 combines a determination result relating to the intersection of the imaging regions with a comparison result obtained by comparing the features of the images, and thereby determines whether or not the imaging devices 11 and 12 are capturing the same subject. After the information processing system 20 completes this determination processing, the information processing system 20 transmits to the imaging device 12 information of imaging devices located in the vicinity of a location indicated by the position information received from the imaging device 12 (step S245). Next, the information processing system 20 updates the information of the imaging devices located in the vicinity of the location indicated by the position information received from the imaging device 11, and transmits the updated information to the imaging device 11 (step S246).

Details of Processing Relating to Image Recognition

Next, the processing relating to image recognition will be explained in more detail with reference to FIG. 25.

Figure 25:
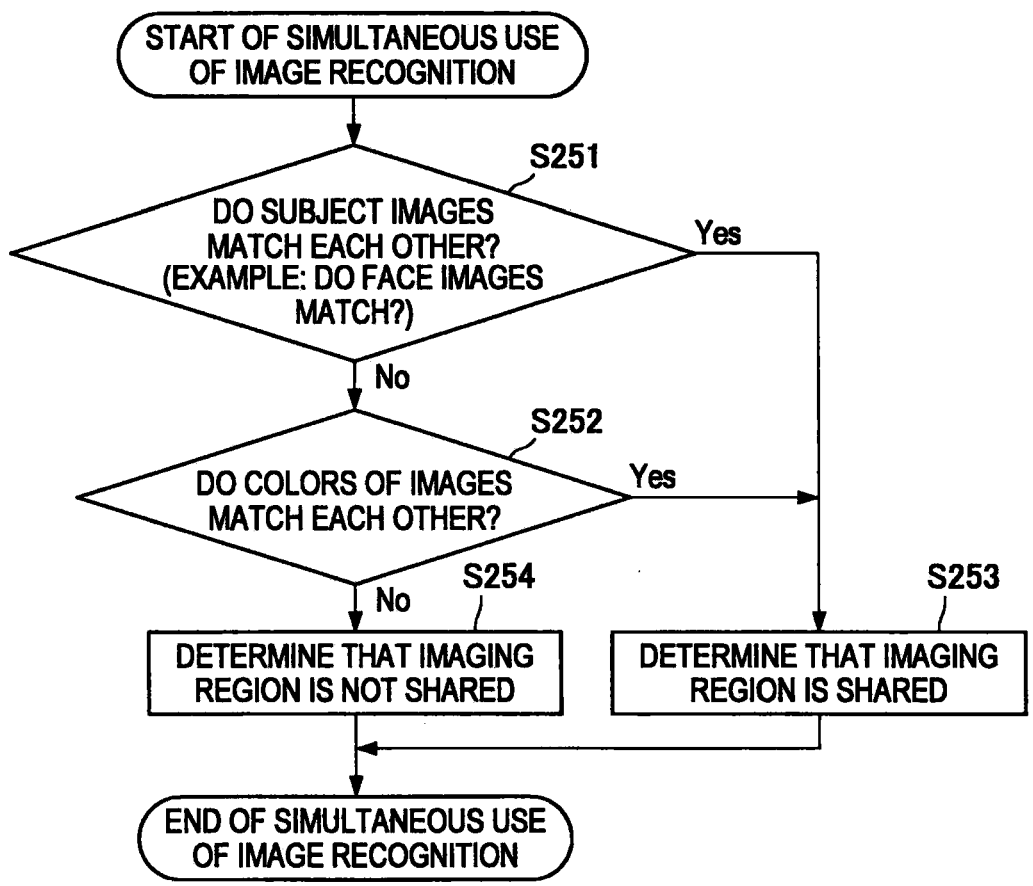
FIG. 25 is an explanatory diagram illustrating the method of simultaneous use of image recognition according to the second exemplary embodiment.

As shown in FIG. 25, first, the information processing system 20 recognizes the subjects appearing in the images received from the imaging devices 11 and 12, and determines whether or not the subjects appearing in both the images match each other (step S251). For example, the information processing system 20 uses the face recognition technology to detect faces of persons included in the images received from the imaging devices 11 and 12, and determines whether or not the faces detected from the both images match each other. When the subjects match each other, the information processing system 20 advances the processing to step S253. On the other hand, when the subjects do not match each other, the information processing system 20 advances the processing to step S252.

When the information processing system 20 advances the processing to step S252, the information processing system 20 determines whether or not colors of the images received from the imaging devices 11 and 12 match each other (step S252). When the colors match each other, the information processing system 20 advances the processing to step S253. On the other hand, when the colors do not match each other, the information processing system 20 advances the processing to step S254. When the information processing system 20 advances the processing to step S253, the information processing system 20 determines that the imaging devices 11 and 12 share the imaging region (step S253), and ends the series of processing relating to image recognition. On the other hand, when the information processing system 20 advances the processing to step S254, the information processing system 20 determines that the imaging processing devices 11 and 12 do not share the imaging region (step S254), and ends the series of processing relating to image recognition.

The method for simultaneously using image recognition technology is explained above. Adoption of this method makes it possible to more accurately detect a set of imaging devices that are sharing the imaging region.

Hereinabove, the second exemplary embodiment of the present technology is explained.

Note that it is also possible to combine the technologies according to the above-described first and second exemplary embodiments. For example, the imaging device according to the first exemplary embodiment can be used as the imaging device included in the system configuration shown in the second exemplary embodiment.

4: Hardware Configuration Example

Figure 26:
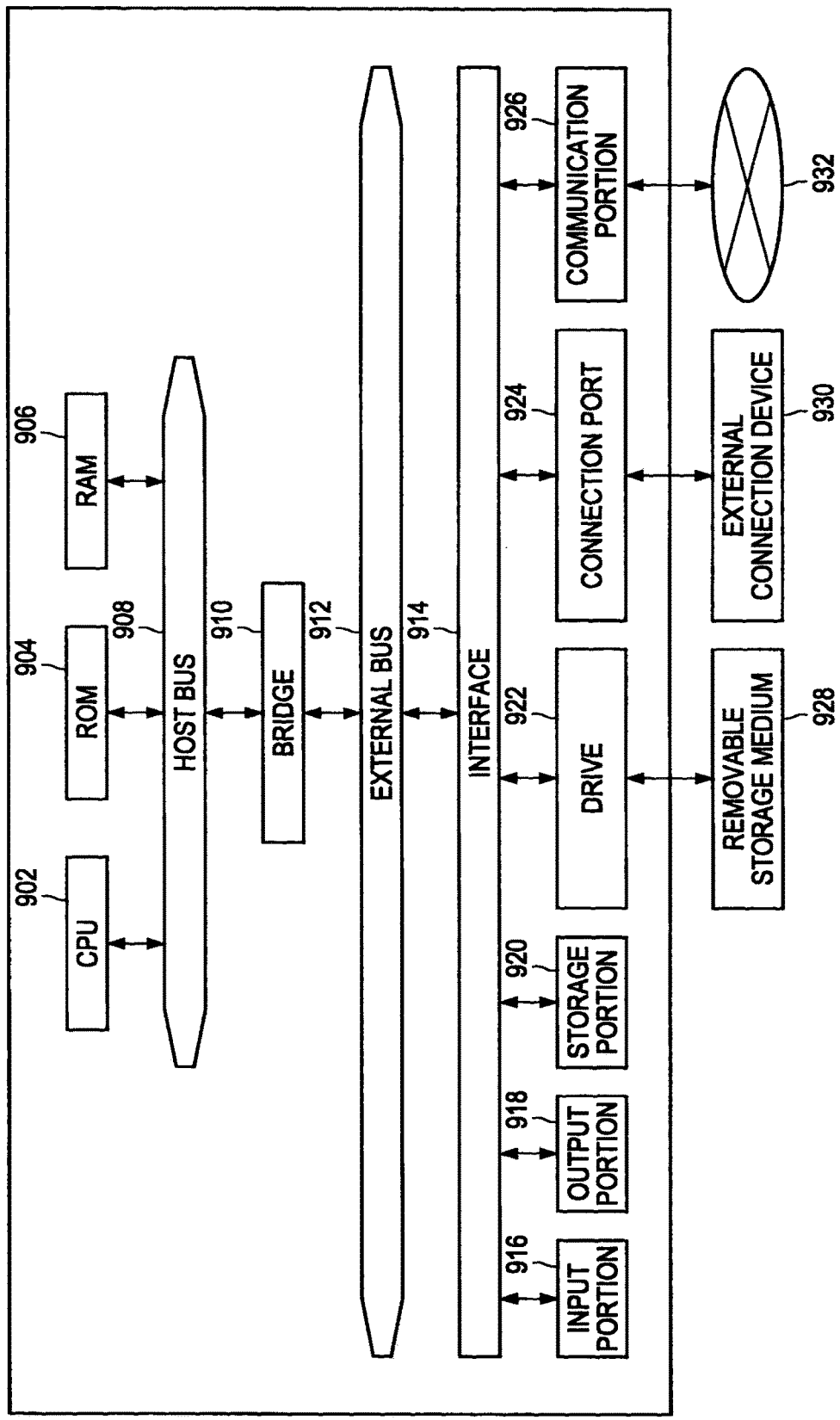
FIG. 26 is an explanatory diagram illustrating a hardware configuration example that can achieve some of the functions of the imaging devices and information processing systems, according to the disclosed exemplary embodiments.

Some of the functions of the above-described imaging device, the various portion associated with the imaging device, or all the functions of the information processing system can be achieved using, for example, a hardware configuration shown in FIG. 26. More specifically, the function of each of the structural elements is achieved by controlling hardware shown in FIG. 26 using a computer program. Note that any type of hardware can be used and examples of this hardware include a personal computer, a mobile phone, a PHS, a PDA, a mobile information terminal, a mobile game console and the like. Note that PHS is an abbreviation for Personal Handy-phone System, and PDA is an abbreviation for Personal Digital Assistant As shown in FIG. 26, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is an example of a tangible, non-transitory computer-readable storage medium or device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removal recording medium 928 is another example of a tangible, non-transitory storage medium, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a modem for various types of communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

5: Conclusion

Lastly, the technical contents according to the above-described exemplary embodiments will be briefly summarized. The technical contents described here can be applied not only to an imaging device, but also to various types of devices equipped with an imaging function, such as a personal computer (PC), a mobile phone, a mobile game console, a mobile information terminal, a cycle computer, a car navigation system and the like. Some of the functions described here can also be achieved by an information processing system, such as a cloud system.

The device according to each of the above-described exemplary embodiments includes the following portions, namely, an imaging portion, a region calculation portion, a region information acquisition portion and an intersection determination portion. The above-described imaging portion captures an image of a subject. The above-described region calculation portion calculates a first imaging region that is captured by the imaging portion. The above-described region information acquisition portion acquires information of a second imaging region that is captured by another imaging device. For example, the region information acquisition portion acquires the information of the second imaging region by performing wireless communication with the other imaging device. Further, when the information of the second imaging region is uploaded to a server or a cloud system connected to a communication network, the region information acquisition portion acquires the information of the second imaging region from the server or the cloud system. Then, the above-described intersection determination portion determines whether or not the first imaging region intersects with the second imaging region.

In this manner, it is possible to determine whether or not the imaging regions intersect with each other, and thus it is possible to easily detect another imaging device that is capturing an image of the same subject or another imaging device that is trying to capture an image of the same subject. Further, if the above-described configuration is applied, even when it is difficult to determine identification of the subjects based on image recognition, another imaging device like that described above can be detected. For example, it is difficult to determine, based on image recognition, whether an image taken from the front of a person matches an image taken from the rear of the same person. However, when the technology according to the above-described exemplary embodiments is applied, it becomes possible to accurately detect another imaging device that is capturing an image of the same subject, regardless of the imaging direction and regardless of which part of the subject is being captured. Further, even in a case where a part of the subject is hidden by a shielding object, for example, when the technology according to the above-described exemplary embodiments is applied, it is possible to accurately detect the other imaging device like that described above.

Remarks

The above-described imaging region calculation portion 108 is an example of the region calculation portion. The above-described region intersection determination portion 110 is an example of the intersection determination portion. The above-described device classification portion 112 is an example of a first grouping portion and a second grouping portion. The above-described region sharing device selection portion 111 and the device classification portion 112 are an example of a front side device extraction portion. The above-described region sharing device selection portion 111 is an example of a target device extraction portion. The above-described image recognition portion 114 is an example of a recognition result acquisition portion and a feature matching determination portion. The above-described imaging region calculation portion 151 is an example of an information transmission portion. The above-described region sharing device information acquisition portion 152 is an example of an information reception portion. The above-described information processing system 20 is an example of an information processing device. The above-described region intersection determination portion 202 is an example of the intersection determination portion. The above-described region sharing device selection portion 203 is an example of a device information providing portion, a device selection portion, the target device extraction portion and a device search portion. The above-described device classification portion 204 is an example of a tag assignment portion.

It should be understood by those skilled in the art that various modifications, combinations, sub-combinations and alterations may occur depending on design requirements and other factors insofar as they are within the scope of the appended claims or the equivalents thereof.

For example, the present technology can adopt the following configurations.

(1) An imaging device comprising:
  an imaging portion that captures an image of a subject;
  a region calculation portion that calculates a first imaging region that is captured by the imaging portion;
  a region information acquisition portion that acquires information of a second imaging region that is captured by at least one other imaging device; and
  an intersection determination portion that determines whether the first imaging region intersects with the second imaging region.

(2) The imaging device according to the (1), further comprising:
  a first grouping portion that groups, in accordance with a distance to a subject, the at least one other imaging device that is capturing the second imaging region for which the intersection is determined by the intersection determination portion.

(3) The imaging device according to the (1) or (2), further comprising:
  a second grouping portion that groups, in accordance with an imaging direction, the at least one other imaging device that is capturing the second imaging region for which the intersection is determined by the intersection determination portion.

(4) The imaging device according to any one of the (1) to (3), further comprising;
  a front side device extraction portion that extracts, from among the at least one other imaging device grouped by the second grouping portion, the other imaging device belonging to a group in which the subject is being captured substantially from the front.

(5) The imaging device according to any one of the (1) to (4), further comprising:
  a target device extraction portion that extracts, from among the at least one other imaging device that is capturing the second imaging region for which the intersection is determined by the intersection determination portion, the other imaging device which has the second imaging region including a subject to which a user is paying attention.

(6) The imaging device according to the (5),
  wherein the target device extraction portion detects a ratio of a predetermined portion of the subject with respect to the second imaging region, and extracts the other imaging device for which the ratio is at least a predetermined value.

(7) The imaging device according to any one of the (1) to (6), further comprising:
  an image recognition portion that recognizes features of a subject image;
  a recognition result acquisition portion that acquires a recognition result of the features of the subject image, from the at least one other imaging device that is capturing the second imaging region for which the intersection is determined by the intersection determination portion; and
  a feature matching determination portion that determines whether the features recognized by the image recognition portion substantially match the recognition result acquired by the recognition result acquisition portion.

(8) The imaging device according to any one of the (1) to (7),
  wherein the region information acquisition portion acquires information of the second imaging region from other imaging devices existing in a predetermined area in which a position on a map specified by a user is used as a reference.

(9) The imaging device according to any one of the (1) to (8),
  wherein the imaging portion includes
    an optical system with a focal distance f, and
    an imaging element with a width $W_0$ and a height $H_0$,
  wherein the imaging device further comprises
    a position detection portion that detects a position P of the imaging device itself,
    an inclination detection portion that detects an inclination of the imaging device itself, and
    a direction detection portion that detects an orientation of the imaging device itself in a plane that is substantially parallel with a ground plane, and
  wherein the region calculation portion calculates the first imaging region based on the position P detected by the position detection portion, the inclination detected by the inclination detection portion, the orientation detected by the direction detection portion, the focal distance f of the optical system, and the width $W_0$ and the height $H_0$ of the imaging element.

(10) The imaging device according to any one of the (1) to (9),
  wherein the first imaging region has a square pyramid shape whose vertex is the position P, and the shape of which is defined by a vertical line extending in an optical axis direction of the optical system and by an inclination of a rotation direction with an optical axis of the optical system serving as an axis of rotation,
  wherein the second imaging region has a square pyramid shape whose vertex is a position P' of the other imaging device and the shape of which is defined by a vertical line extending in an optical axis direction of an optical system of the other imaging device, and by an inclination of a rotation direction with the optical axis serving as an axis of rotation, and wherein the intersection determination portion determines whether the square pyramid corresponding to the first imaging region intersects with the square pyramid corresponding to the second imaging region.

(11) The imaging device according to any one of the (1) to (10), wherein the imaging portion includes
an optical system with a focal distance f, and
an imaging element with a width $W_0$, wherein the imaging device further comprises
a position detection portion that detects a position P of the imaging device itself, and
a direction detection portion that detects an orientation of the imaging device itself in a plane that is substantially parallel with a ground plane, and wherein the region calculation portion calculates the first imaging region based on the position P detected by the position detection portion, the orientation detected by the direction detection portion, the focal distance f of the optical system, and the width $W_0$ of the imaging element.

(12) The imaging device according to the (11), wherein the first imaging region has a triangular shape whose vertex is the position P and in which an orientation of a vertical line drawn from the vertex to a base is the orientation detected by the direction detection portion, the triangular shape being substantially in parallel with the ground plane and being defined by two straight lines that intersect at the position P and that are inclined laterally from the vertical line by $W_0/2f$, wherein, when an optical system of the other imaging device has a focal distance f' and an imaging element of the other imaging device has a width $W_0'$, the second imaging region has a triangular shape whose vertex is a position P' of the other imaging device and in which an orientation of a vertical line drawn from the vertex to a base is an orientation of the other imaging device, the triangular shape being substantially in parallel with the ground plane and being defined by two straight lines that intersect at the position P' and that are inclined laterally from the vertical line by $W_0'/2f'$, and wherein the intersection determination portion determines whether the triangle corresponding to the first imaging region intersects with the triangle corresponding to the second imaging region.

(13) The imaging device according to any one of the (1) to (12), further comprising:

a position detection portion that detects a position P of the imaging device itself, wherein the region information acquisition portion directly acquires information of the second imaging region from other imaging devices existing in a predetermined area in which the position P detected by the position detection portion is used as a reference.

(14) An imaging device comprising:

an imaging portion that captures an image of a subject;
a region calculation portion that calculates a first imaging region that is captured by the imaging portion;
an information transmission portion that transmits information of the first imaging region calculated by the region calculation portion; and an information reception portion that receives information relating to at least one other imaging device that is capturing a second imaging region that intersects with the first imaging region calculated by the region calculation portion.

(15) An information processing device comprising:

a region information acquisition portion that acquires information of first to N-th imaging regions that are respectively captured by first to N-th imaging devices, where N is an integer of at least two;
an intersection determination portion that extracts a set of imaging regions that intersect with each other, from among the first to the N-th imaging regions; and
a device information providing portion that provides each of the imaging devices corresponding to the set of imaging regions extracted by the intersection determination portion with information relating to all the imaging devices corresponding to the set of imaging regions.

(16) The information processing device according to the (15), further comprising:

a device selection portion that extracts imaging regions including a predetermined subject, from among the first to the N-th imaging regions, and selects imaging devices corresponding to the extracted imaging regions; and
a target device extraction portion that extracts an imaging device that is selected by the device selection portion a predetermined number of times or more within a predetermined time period.

(17) The information processing device according to the (15) or (16), further comprising:

a tag assignment portion that assigns, to each of the imaging devices corresponding to the set of imaging regions extracted by the intersection determination portion, at least one of a tag relating to a positional relationship between the imaging devices, a tag relating to a distance between a subject and each of the imaging devices, and a tag relating to a positional relationship between the subject and each of the imaging devices.

(18) The information processing device according to any one of the (15) to (17), further comprising:

a device selection portion that extracts imaging regions including a predetermined subject, from among the first to the N-th imaging regions, and selects imaging devices corresponding to the extracted imaging regions; and
a target device extraction portion that extracts, from among the imaging devices selected by the device selection portion, an imaging device existing in an imaging region that is rated highly as an imaging region for the predetermined subject.

(19) The information processing device according to any one of the (15) to (18), further comprising:

a device search portion that performs a search for the imaging devices based on at least one of a number of users who are viewing video captured by each of the imaging devices, a rating relating to the video, and information of a subject included in the video.

(20) An imaging region sharing determination method comprising:

calculating a first imaging region captured by a first imaging device;
calculating a second imaging region captured by a second imaging device; and
determining whether the first imaging region intersects with the second imaging region.

What is claimed is:

1. An information processing apparatus, comprising:
a detection unit configured to detect a first imaging region of a first imaging device and to detect a second imaging region of a second imaging device, wherein the first imaging region is a three-dimensional first imaging space associated with the first imaging device and the second imaging region is a three-dimensional second imaging space associated with the second imaging device;
a receiving unit configured to receive first information associated with the first imaging region and second information associated with the second imaging region;
a determination unit configured to determine, based on at least the first and second imaging region information, whether a portion of the first imaging region is coincident within at least a portion of the second imaging region; and
a classification unit configured to assign a classification to at least one of the first or second imaging devices, when the portions of the first and second imaging regions are coincident,
wherein the detection unit, the receiving unit, the determination unit and the classification unit are each implemented via at least one processor.

2. The information processing apparatus of claim 1, wherein:
the first imaging region information is associated with at least a portion of a first image; and
the second imaging region is associated with at least a portion of a second image.

3. The information processing apparatus of claim 2, further comprising a calculation unit configured to calculate at least one of the first imaging region corresponding to the first image portion or the second imaging region corresponding to the second imaging portion,
wherein the calculation unit is implemented via at least one processor.

4. The information processing apparatus of claim 2, further comprising an image recognition unit configured to determine whether a subject of the first image corresponds to a subject of the second image, wherein the classification unit is further configured to assign the classification to the first and second image portions, when the first image subject corresponds to the second image subject,
wherein the image recognition unit is implemented via at least one processor.

5. The information processing apparatus of claim 1, wherein the receiving unit is further configured to receive the second imaging region information, when spatial position of the second imaging device falls within a threshold distance of spatial position of the first imaging device.

6. The information processing apparatus of claim 1, further comprising a calculation unit configured to calculate at least one of the first imaging region or the second imaging region,
wherein the calculation unit is implemented via at least one processor.

7. The information processing of claim 6, wherein:
the detection unit is further configured to detect inclinations and orientations corresponding to the first and second imaging devices; and
the calculation unit is further configured to calculate at least one of the first imaging region or the second imaging region, based on values of spatial position, inclination, and orientation associated with corresponding ones of the first and second imaging devices.

8. The information processing apparatus of claim 1, wherein the detection unit is further configured to:
detect a first distance separating the first imaging device and a corresponding first subject; and
detect a second distance separating the second imaging device and a corresponding second subject.

9. The information processing apparatus of claim 8, wherein the classification unit is further configured to assign the classification to the first and second imaging devices, based on the detected first and second distances.

10. The information processing apparatus of claim 9, wherein the classification unit is further configured to:
determine imaging directions associated with the first and second imaging devices, based on corresponding first and second imaging region information; and
assign the classification to the first and second imaging devices, based on corresponding ones of the detected first and second distances and corresponding ones of the determined imaging directions.

11. The image processing apparatus of claim 1, further comprising an image recognition unit configured to:
receive a first image captured by the first imaging device and a second image captured by the second imaging device; and
determine that a subject of the first image corresponds to a subject of the second image,
wherein the image recognition unit is implemented via at least one processor.

12. The image processing apparatus of claim 11, wherein the classification unit is further configured to assign the classification to the first and second imaging devices, when the subject of the first image corresponds to a subject of the second image.

13. The information processing apparatus of claim 1, further comprising a display control unit configured to:
display, to a user, representation of a portion of a geographical region associated with the first and second imaging regions; and
superimpose a boundary of the second imaging region onto the representation,
wherein the display control unit is implemented via at least one processor.

14. The information processing apparatus of claim 13, wherein the receiving unit is further configured to receive, from the user, information identifying a selection of the second imaging region.

15. The information processing apparatus according to claim 1, wherein the imaging region is spatial position of an imaging device.

16. The information processing apparatus according to claim 1, wherein the first imaging region and the second imaging region have square pyramid shapes.

17. An information processing apparatus, comprising:
a detecting means for detecting a first imaging region of a first imaging device and to detect a second imaging region of a second imaging device, wherein the first imaging region is a three-dimensional first imaging space associated with the first image device and the second imaging region is a three-dimensional second imaging space associated with the second image device;
a receiving means for receiving first information associated with the first imaging region and second information associated with the second imaging region;
a determination means for determining, based on at least the first and second imaging region information, whether a portion of the first imaging region is coincident within at least a portion of the second imaging region; and a classification means for assigning a classification to at least one of the first or second imaging devices, when the portions of the first and second imaging regions are coincident.

18. A computer-implemented method, the method being executed via at least one processor, and comprising:

detecting a first imaging region of a first imaging device and detecting a second imaging region of a second imaging device, wherein the first imaging region is a three-dimensional first imaging space associated with the first image device and the second imaging region is a three-dimensional second imaging space associated with the second image device;

receiving first information associated with the first imaging region and second information associated with the second imaging region;

determining, based on at least the first and second imaging region information, whether a portion of the first imaging region is coincident within at least a portion of the second imaging region; and assigning, using a processor, a classification to at least one of the first or second imaging devices, when the portions of the first and second imaging regions are coincident.

19. A tangible, non-transitory computer-readable medium storing instructions that, when executed by at least one processor, cause the processor to perform a method, comprising:

detecting a first imaging region of a first imaging device and detecting a second imaging region of a second imaging device, wherein the first imaging region is a three-dimensional first imaging space associated with the first imaging device and the second imaging region is a three-dimensional second imaging space associated with the second imaging device;

receiving first information associated with the first imaging region and second information associated with the second imaging region;

determining, based on at least the first and second imaging region information, whether a portion of the first imaging region is coincident within at least a portion of the second imaging region; and assigning a classification to at least one of the first or second imaging devices, when the portions of the first and second imaging regions are coincident.

* * * * *